(12) United States Patent
Sakata et al.

(10) Patent No.: US 8,477,601 B2
(45) Date of Patent: Jul. 2, 2013

(54) NETWORK MANAGEMENT STATION, NETWORK CONTROL SYSTEM, AND NETWORK MANAGEMENT METHOD

(75) Inventors: Masayuki Sakata, Matsudo (JP); Takahiro Fujishiro, Yokohama (JP); Erika Tanaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 635 days.

(21) Appl. No.: 12/702,609

(22) Filed: Feb. 9, 2010

(65) Prior Publication Data

US 2010/0202465 A1 Aug. 12, 2010

(30) Foreign Application Priority Data

Feb. 10, 2009 (JP) ................. 2009-027961

(51) Int. Cl.
*H04J 3/14* (2006.01)
*G06F 15/177* (2006.01)

(52) U.S. Cl.
USPC ........... 370/229; 370/235; 370/400; 709/221; 709/225

(58) Field of Classification Search
USPC ............ 370/229, 325, 338, 360, 400, 395.53; 709/221, 224, 225
See application file for complete search history.

(56) References Cited

U.S. PATENT DOCUMENTS

| 5,459,720 A * | 10/1995 | Iliev et al. ............... 370/393 |
|---|---|---|
| 6,665,702 B1 | 12/2003 | Zisapel et al. |
| 2003/0005112 A1 * | 1/2003 | Krautkremer ............... 709/224 |
| 2005/0185653 A1 | 8/2005 | Ono et al. |
| 2005/0192969 A1 * | 9/2005 | Haga et al. ............... 707/10 |
| 2006/0039335 A1 | 2/2006 | Ono et al. |
| 2008/0095184 A1 | 4/2008 | Yashima et al. |
| 2008/0250127 A1 * | 10/2008 | Sugisawa ................ 709/221 |

FOREIGN PATENT DOCUMENTS

| JP | 2005-244525 A | 9/2005 |
|---|---|---|
| JP | 2006-060579 A | 3/2006 |
| JP | 2007-266834 A | 10/2007 |
| JP | 2008-104110 A | 5/2008 |

* cited by examiner

*Primary Examiner* — Hassan Phillips
*Assistant Examiner* — Saba Tsegaye
(74) *Attorney, Agent, or Firm* — Foley & Lardner LLP

(57) ABSTRACT

The present invention enables dynamic route switching according to link quality, while maintaining the quality of a plurality of routes. According to quality information received from a second network control entity, if the control unit of a network management station has determined that the quality of communication over a particular link has degraded, the control unit assigns a link whose current throughput satisfies a bandwidth required for a service defined in the service contract and whose response time satisfies minimum response time defined in the service contract to each service in descending order of priority.

18 Claims, 15 Drawing Sheets

FIG. 3

| USER HUB AREA ID | LINK ID | LINK TYPE | BAND-WIDTH (bps) | ADDRESS | THROUGHPUT (bps) | RESPONSE TIME (ms) | LATEST MEASUREMENT DATE/TIME | UPDATED DATE/TIME |
|---|---|---|---|---|---|---|---|---|
| A-1 | A-1-1 | WIRED WAN LINK SERVICE A | 1000M | 20.1.1.0/24 | 600M | 100 | 2008/08/02 22:10:15 | 2008/08/02 22:10:25 |
| A-1 | A-1-2 | WIRELESS WAN LINK SERVICE B | 30M | 30.1.1.0/24 | 10M | 100 | 2008/08/02 22:10:16 | 2008/08/02 22:10:26 |
| B-1 | B-1-1 | WIRED WAN LINK SERVICE A | 1000M | 20.1.2.0/24 | 600M | 100 | 2008/08/02 22:10:10 | 2008/08/02 22:10:20 |
| B-1 | B-1-2 | WIRELESS WAN LINK SERVICE B | 30M | 30.1.2.0/24 | 10M | 120 | 2008/08/02 22:10:11 | 2008/08/02 22:10:21 |
| C-1 | C-1-1 | WIRED WAN LINK SERVICE A | 1000M | 20.1.3.0/24 | 600M | 100 | 2008/08/02 22:10:12 | 2008/08/02 22:10:32 |
| C-1 | C-1-2 | WIRELESS WAN LINK SERVICE B | 30M | 30.1.3.0/24 | 10M | 150 | 2008/08/02 22:10:13 | 2008/08/02 22:10:23 |
| ... | ... | ... | ... | ... | ... | ... | ... | ... |

FIG. 4

| CONTRACT ID (113b) | USER HUB AREA ID (113c) | CONTRACTED SERVICE (113d) | SERVICE ACCESS INFORMATION (113e) | DEFAULT LINK ID (113f) | BANDWIDTH IN USE (bps) (113g) | MIN. RESPONSE TIME (ms) (113h) | MIN. ENSURED BANDWIDTH IN CASE OF EMERGENCY (bps) (113i) | PRIORITY AMONG COMMUNICATIONS IN THE HUB AREA (113j) | SOURCE ADDRESS CHANGE ENABLE/ DISABLE FLAG (113k) |
|---|---|---|---|---|---|---|---|---|---|
| A-1-a | A-1 | SIMULATION SERVICE | 10.1.10.1.80 | A-1-1 | 50M | 200 | 10M | 3 | Yes |
| A-1-b | A-1 | SECURITIES TRADING SERVICE | 10.1.10.2.80 | A-1-1 | 30M | 200 | 10M | 1 | Yes |
| A-1-c | A-1 | STOCK PRICE INFORMATION DELIVERY SERVICE | 10.1.10.3.80 | A-1-2 | 30M | 500 | 10M | 2 | Yes |
| ... | ... | ... | ... | ... | ... | ... | ... | ... | ... |

| CONTRACT ID | LINK BEING USED NOW | BANDWIDTH IN USE |
|---|---|---|
| A-1-a | A-1-1 | 50M |
| A-1-b | A-1-1 | 30M |
| A-1-c | A-1-2 | 30M |
| ⋮ | ⋮ | ⋮ |

FIG. 6

| TICKET ID (115b) | DATE/TIME OF DETECTION (115c) | DATE TIME OF RECOVERY (115d) | STATUS (115e) | HUB AREA ID (115f) | TROUBLE ID (115g) | TROUBLE DETAIL (115h) |
|---|---|---|---|---|---|---|
| T1 | 2008/08/01 12:14:00 | 2008/08/01 12:20:00 | REMEDIED | B-1 | 101 | - |
| T2 | 2008/08/02 22:10:21 | - | DETECTED | A-1 | 201 | UNSATISFIED ITEM: RESPONSE<br>RELEVANT CONTRACT ID: A-1-a<br>THRESHOLD: 200ms<br>MEASURED VALUE: 300ms<br><br>UNSATISFIED ITEM: RESPONSE<br>RELEVANT CONTRACT ID: A-1-b<br>THRESHOLD: 200ms<br>MEASURED VALUE: 300ms |
| T3 | 2008/08/02 22:10:31 | - | DETECTED | B-1 | 201 | UNSATISFIED ITEM: RESPONSE<br>RELEVANT CONTRACT ID: B-1-a<br>THRESHOLD: 200ms<br>MEASURED VALUE: 300ms |
| T4 | 2008/08/02 22:10:35 | - | DETECTED | C-1 | 201 | UNSATISFIED ITEM: RESPONSE<br>RELEVANT CONTRACT ID: C-1-a<br>THRESHOLD: 200ms<br>MEASURED VALUE: 300ms |
| ... | ... | ... | ... | ... | ... | ... |

| REMEDY ID 120b | CONTRACT ID 120c | LINK BEING USED NOW 120d | LINK TO BE USED AFTER CHANGE 120e | BANDWIDTH BEING USED NOW 120f | BANDWIDTH TO BE USED AFTER CHANGE 120g | DEGREE OF ATTAINING QUALITY CONDITIONS 120h | AVERAGE DEGREE OF ATTAINING QUALITY CONDITIONS 120i | NUMBER OF TIMES OF ROUTE SWITCHING 120j |
|---|---|---|---|---|---|---|---|---|
| 1 | A-1-b | A-1-1 | A-1-2 | 30M | 30M | 20 | 18.33 | 3 |
| | A-1-c | A-1-2 | A-1-1 | 30M | 30M | 20 | | |
| | A-1-a | A-1-1 | A-1-2 | 30M | 10M | 15 | | |
| 2 | A-1-b | A-1-1 | A-1-2 | 30M | 30M | 20 | 16.67 | 2 |
| | A-1-c | A-1-2 | A-1-2 | 30M | 10M | 15 | | |
| | A-1-a | A-1-1 | A-1-2 | 30M | 10M | 15 | | |
| ... | ... | ... | ... | ... | ... | ... | ... | ... |

| 213b | 213c | 213d | 213e | 213f | 213g | 213h | 213i | 213j | 213k | 213l |
|---|---|---|---|---|---|---|---|---|---|---|
| CONTRACT ID | USER HUB AREA ID | CONTRACTED SERVICE | SERVICE ACCESS INFORMATION | DEFAULT LINK ID | BANDWIDTH IN USE (bps) | MIN. RESPONSE TIME (ms) | MIN. ENSURED BANDWIDTH IN CASE OF EMERGENCY (bps) | PRIORITY AMONG COMMUNICATIONS IN THE HUB AREA | SOURCE ADDRESS CHANGE ENABLE/ DISABLE FLAG | AVERAGE RESPONSE TIME (ms) |
| A-1-a | A-1 | SECURITIES TRADING SERVICE | 10.1.10.1:80 | A-1-1 | 30M | 200 | 20M | 1 | Yes | 100 |
| B-1-a | B-1 | SECURITIES TRADING SERVICE | 10.1.10.1:80 | B-1-1 | 30M | 200 | 20M | 1 | Yes | 200 |
| C-1-b | C-1 | SECURITIES TRADING SERVICE | 10.1.10.1:80 | C-1-1 | 30M | 200 | 20M | 2 | Yes | 150 |
| ... | ... | ... | ... | ... | ... | ... | ... | ... | ... | ... |

FIG. 16

| USER HUB AREA ID | LINK ID | LINK TYPE | BAND-WIDTH (bps) | ADDRESS | THROUGHPUT (bps) | RESPONSE TIME (ms) | STANDARD DEVIATION OF RESPONSE TIME |
|---|---|---|---|---|---|---|---|
| A-1 | A-1-1 | WIRED WAN LINK SERVICE A | 1000M | 20.1.1.0/24 | 600M | 100 | 5 |
| A-1 | A-1-2 | WIRELESS WAN LINK SERVICE B | 30M | 30.1.1.0/24 | 10M | 100 | 15 |
| B-1 | B-1-1 | WIRED WAN LINK SERVICE A | 1000M | 20.1.2.0/24 | 600M | 100 | 5 |
| B-1 | B-1-2 | WIRELESS WAN LINK SERVICE B | 30M | 30.1.2.0/24 | 10M | 120 | 20 |
| C-1 | C-1-1 | WIRED WAN LINK SERVICE A | 1000M | 20.1.3.0/24 | 600M | 100 | 5 |
| C-1 | C-1-2 | WIRELESS WAN LINK SERVICE B | 30M | 30.1.3.0/24 | 10M | 150 | 20 |
| ... | ... | ... | ... | ... | ... | ... | ... |

NETWORK MANAGEMENT STATION, NETWORK CONTROL SYSTEM, AND NETWORK MANAGEMENT METHOD

INCORPORATION BY REFERENCE

This application claims priority based on a Japanese patent application, No. 2009-027961 filed on Feb. 10, 2009, the entire contents of which are incorporated herein by reference.

BACKGROUND

The present invention relates to a technique for determining a combination of links to be used by a node coupled to a plurality of links.

The appearance of Next Generation Networks (hereinafter referred to as NGNs) and a variety of wireless communication services has increased options of links of Wide Area Networks (hereinafter referred to as WANs). Especially, companies contract with a network operator to use plural types of WAN links so that communication is enabled over these links (hereinafter, this is referred to as a multi-home environment). Thereby, communication is maintained even in case a failure occurs in a particular WAN link and availability is enhanced.

On the other hand, network operators providing communication services contract with users to provide a comprehensive service involving new networks coming up one after another in a form that physical networks are concealed, instead of providing each of the new networks upon its coming up as a new service to users. In this way, by early provision of a new, less-costly, high-function network to users, the network operators are achieving operation cost reduction. Consequently, users can make use of a latest network as a high-speed, large-capacity, and stable network early without being aware of new network services coming up one after another.

In such circumstances, techniques for improving communication performance by making effective use of a plurality of WAN links in the multi-home environment are developed. For example, U.S. Pat. No. 6,665,702 discloses a technique for providing communication over an optimum route in response to a communication access request from a client. This technique measures communications between a gateway that couples to a plurality of WAN links and a server and determines an optimal route based on information such as delay time and the number of hops, without using a predetermined main link and sub-link statically.

SUMMARY

The technique described in U.S. Pat. No. 6,665,702 assumes that a communication from one client can be carried out by using one of a plurality of links. However, for example, in an environment where a plurality of links are already used for communications for different services in a hub area of a company, in case a link has degraded, simply switching traffic carried on the link to another link may affect communications already provided using another link to which the switching has been done.

In the technique described in U.S. Pat. No. 6,665,702, client terminals in the communication system perform communication link switching according to the decision of each client. However, for example, in a case where communications are performed from a plurality of hub areas in multi-home environments to a server in the center, when the overall quality of a particular WAN link has degraded, if switching to another link is performed only by the decision in the hub area side, then the link switching occurs simultaneously in the plurality of hub areas. Traffic is concentrated on another link to which the switching has been done and there is a possibility that degradation occurs also in the quality of this another link which was being used efficiently.

The disclosed system provides a technique enabling dynamic route switching according to link quality, while maintaining the quality of a plurality of routes.

To solve the above-noted problem, the disclosed system, if the quality in communication over a particular link has degraded, assigns a link whose required communication quality is maintained to each of services in descending order of priority to carry out communications.

In an example, a disclosed system is directed to a network management station for determining a combination of links to be used by a network control entity that performs communication via a plurality of links. The network management station comprises a storage unit for storing contract link information specifying links, throughputs of the links, and response times of the links; and service contract information specifying links in use for services, bandwidths in use by the links, minimum response times required for the links, minimum ensured bandwidths required for the links, and priority levels of the services; and a control unit. The control unit, if having determined that at least either of the throughput and the response time of a link in the contract link information does not satisfy the minimum ensured bandwidth or the minimum response time for the link in the service contract information, assigns a link whose throughput in the contract link information satisfies either of its minimum ensured bandwidth and its bandwidth in use in the service contract information and whose response time in the contract link information satisfies its minimum response time in the service contract information to each of the services in descending order of priority in the service contract information.

As outlined above, according to the teaching herein, it is possible to carry out dynamic route switching according to link quality, while maintaining the quality of a plurality of routes.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a diagram illustrating an overview of a contract link information table;

FIG. 4 is a diagram illustrating an overview of a service contract information table;

FIG. 5 is a diagram illustrating an overview of a link in use information table;

FIG. 6 is a diagram illustrating an overview of a trouble ticket information table;

FIG. 11 is a diagram illustrating an overview of a link usage plan table;

FIG. 13 is a diagram illustrating an overview of a service contract information table;

FIG. 16 is a diagram illustrating an overview of a contract link information table.

DETAILED DESCRIPTION OF THE EMBODIMENTS

Figure 1:
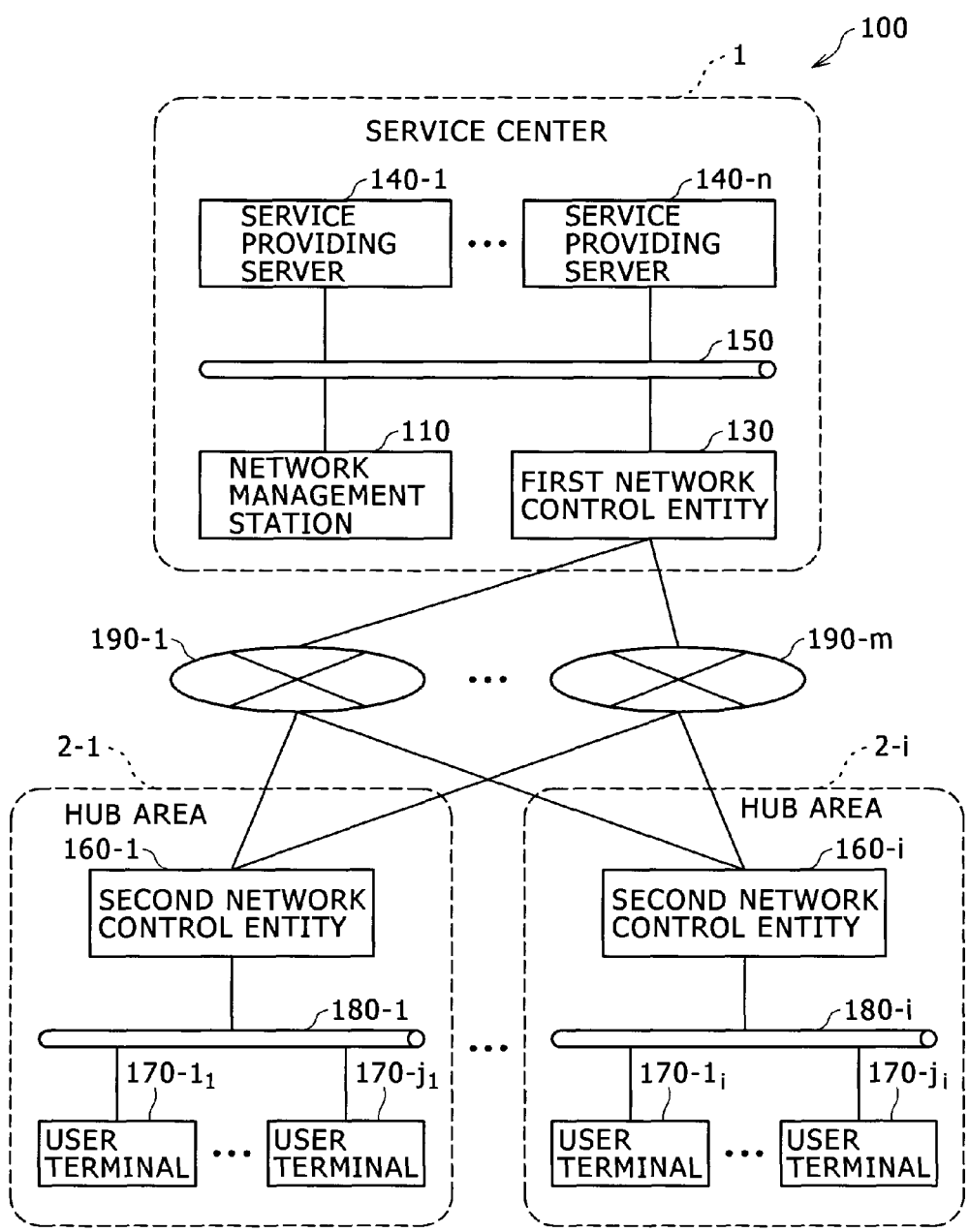
FIG. 1 is a diagram illustrating an overview of a network control system.

FIG. 1 is an overview diagram of a network control system 100 which is a first embodiment. As shown here, the network control system 100 includes a network management station 110, a first network control entity 130, service providing servers 140-1, ..., 140-n (where n is a natural number of 2 or more; they may be referred to as a service providing server(s) 140 in a context that distinguishing each service providing server is not needed), second network control entities 160-1, ..., 160-i (where i is a natural number of 2 or more; they may be referred to as a network control entity or entities 160 in a context that distinguishing each is not needed), and user terminals 170-1$_i$, ..., 170-j$_i$ (where j is a natural number of 2 or more; they may be referred to as a user terminal(s) 170 in a context that distinguishing each is not needed).

The network management station 110, first network control entity 130, and service providing servers 140 are situated in a service center 1, allowed to transmit and receive information to/from each other via a LAN (Local Area Network) 150, and allowed to couple to WANs 190-1, ..., 190-m (where m is a natural number of 2 or more; they may be referred to as a WAN(s) 190 in a context that distinguishing each is not needed) via the first network control entity 130.

The second network control entities 160-1, ..., 160-i and user terminals 170 are situated in respective hub areas 2-1, ..., 2-i (which may be referred to as a hub area(s) 2 in a context that distinguishing each hub area is not needed) and allowed to transmit and receive information to/from each other via LANs 180-1, ..., 180-i (which may be referred to as a LAN(s) 180 in a context that distinguishing each LAN is not needed).

The user terminals 170 situated in the respective hub areas 2 are allowed to couple to WAN 190-1, ..., 190-m (where m is a natural number of 2 or more; they may be referred to as the WAN(s) 190 in a context that distinguishing each is not needed) via the second network control entities 160-1, ..., 160-i.

Figure 2:
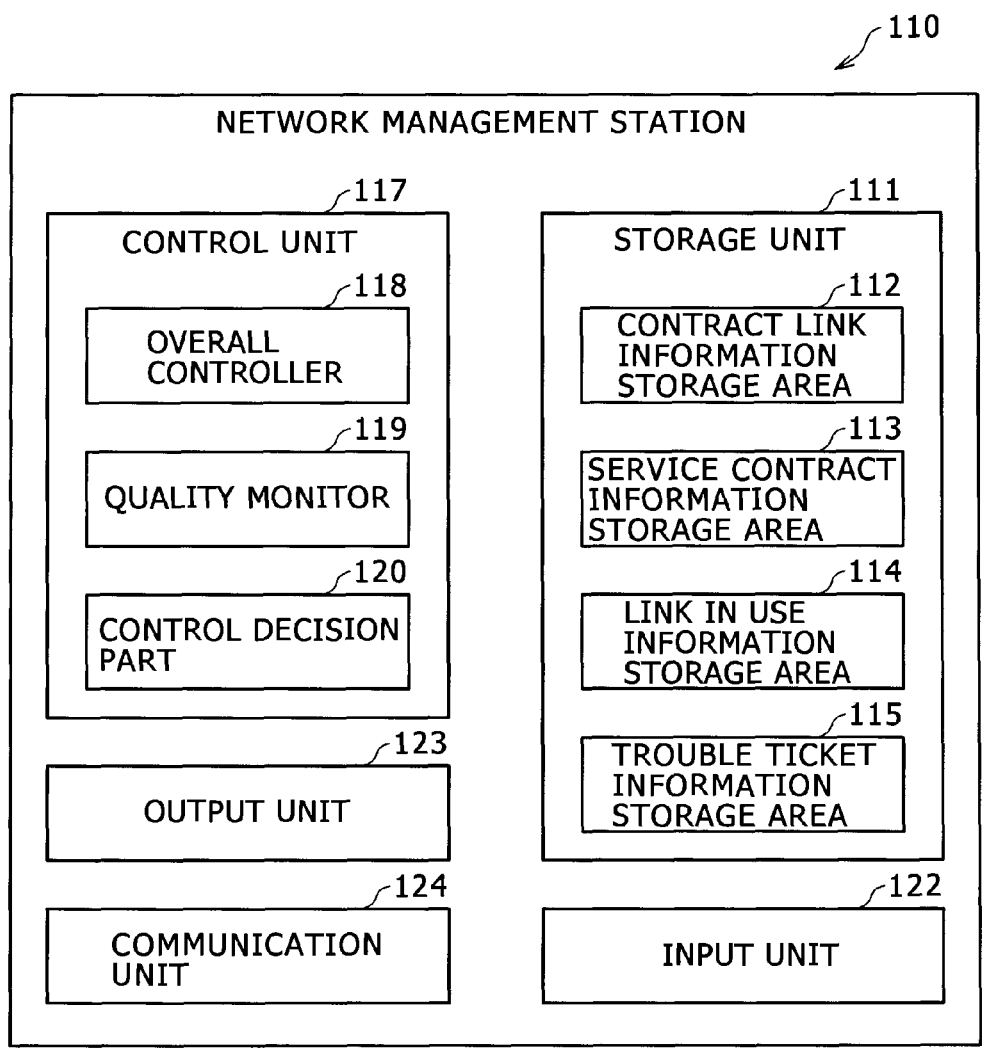
FIG. 2 is a diagram illustrating an overview of a network management station.

FIG. 2 is an overview diagram of the network management station 110. As shown here, the network management station 110 includes a storage unit 111, a control unit 117, an input unit 122, an output unit 123, and a communication unit 124.

The storage unit 111 includes a contract link information storage area 112, a service contract information storage area 113, a link in use information storage area 114, and a trouble ticket information storage area 115.

In the contract link information storage area 112, contract link information specifying WANs 190 that users in each hub area 2 are allowed to use and the attributes of the WANs 190 is stored. In the present embodiment, for example, a contract link information table 112a is stored which is illustrated in FIG. 3 (an overview diagram of a contract link information table 112a).

The contract link information table 112a has a user hub area ID column 112b, link ID column 112c, link type column 112d, bandwidth 112e, address column 112f, throughput column 112g, response time column 112h, latest measurement date/time column 112i, and update date/time column 112j.

In the user hub area ID column 112b, information identifying a hub area 2 where a user resides is stored. Here, in the present embodiment, as the information identifying a hub area 2, a hub area ID is stored which is identification information to uniquely identify each hub area 2.

In the link ID column 112c, information identifying a link (WAN 190) that a user terminal 170 situated in the hub area 2 identified in the user hub area ID column 112b is allowed to couple is stored. Here, in the present embodiment, as the information identifying a link (WAN 190), a link ID is stored which is identification information to uniquely identify each link (WAN 190).

In the link type column 112d, information specifying a type of the link identified in the link ID column 112c is stored. Here, in the present embodiment, as the information specifying a type of the link, the name of the link is stored.

In the bandwidth 112e, information specifying a bandwidth that can be accommodated by the link identified in the link ID column 112c is stored.

In the address column 112f, information specifying an address for communication assigned to the hub area 2 identified in the user hub area ID column 112b is stored.

In the throughput column 112g, information specifying a throughput (an actual bandwidth) measured by at least either of the second network control entity 160 situated in the hub area 2 identified in the user hub area ID column 112b and the first network control entity 130 situated in the service center 1 is stored.

In the response time column 112h, information specifying a response time measured by at least either of the second network control entity 160 situated in the hub area 2 identified in the user hub area ID column 112b and the first network control entity 130 situated in the service center 1 is stored.

In the latest measurement date/time column 112i, information specifying latest date/time when at least either of the throughput and the response time was measured by at least either of the second network control entity 160 situated in the hub area 2 identified in the user hub area ID column 112b and the first network control entity 130 situated in the service center 1 is stored.

In the update date/time column 112j, information specifying date/time when the contract link information table 112a was updated, based on quality information on the link identified in the link ID column 112c.

Returning to FIG. 2, in the service contract information storage area 113, service contract information specifying a user's contracted service for a user residing in each hub area 2 and communication conditions for accessing the service is stored. In the present embodiment, for example, a service contract information table 113a is stored which is illustrated in FIG. 4 (an overview diagram of a service contract information table 113a).

The service contract information table 113a has a contract ID column 113b, user hub area ID column 113c, contracted service column 113d, service access information column 113e, default link ID column 113f, bandwidth in use column 113g, minimum response time column 113h, minimum ensured bandwidth in case of emergency column 113i, priority among communications in the hub area column 113j, and source address change enable/disable flag column 113k.

In the contract ID column 113b, information identifying each contract for providing a service via a service providing server 140 is stored. Here, in the present embodiment, a contract ID is stored which is identification information to uniquely identify each contract.

In the user hub area ID column 113c, information identifying a hub area 2 in which a user who made the contract identified in the contract ID column 113b with a service provider resides is stored. Here, in the present embodiment, as the information identifying a hub area 2, a hub area ID is stored which is identification information to uniquely identify each hub area 2.

In the contracted service column 113d, information specifying a service provided under the contract identified in the contract ID column 113b is stored. Here, in the present embodiment, as the information specifying a service, the service name is stored.

In the service access information column 113e, information specifying a communicative address for receiving the service provided under the contract identified in the contract ID column 113b is stored. Here, in the present embodiment, as the information specifying a communicative address, an IP address and a port number or URL (Uniform Resource Locator) of the relevant service providing server 140 is stored. Here, in the present embodiment, an IP address and a port number are stored.

In the default link ID column 113f, information identifying a link (WAN 190) which is normally used when receiving the service provided under the contract identified in the contract ID column 113b is stored. Here, in the present embodiment, as the information identifying a link (WAN 190), a link ID is stored which is identification information to uniquely identify each link (WAN 190).

In the bandwidth in use column 113g, information specifying an upper limit bandwidth which is normally used when receiving the service provided under the contract identified in the contract ID column 113b is stored.

In the minimum response time column 113h, information specifying a minimum response time indicative of the minimum necessary quality of communication to maintain a quality of service when receiving the service provided under the contract identified in the contract ID column 113b is stored.

In the minimum ensured bandwidth in case of emergency column 113i, information specifying a bandwidth that is required to be maintained at minimum in the event of a communication fault or a quality degradation, when receiving the service provided under the contract identified in the contract ID column 113b, is stored.

In the priority among communications in the hub area column 113j, information specifying a priority level of the service provided under the contract identified in the contract ID column 113b in each hub area 2 is stored. Here, in the present embodiment, as the information specifying a priority level, a natural number is stored. The smaller the natural number, the higher will be the priority level. However, ordering of priority is not restricted to this manner.

In the source address change enable/disable flag column 113k, information indicating whether or not to allow communication route switching that entails source address change, when receiving the service provided under the contract identified in the contract ID column 113b, is stored. Here, in the present embodiment, if a letter string "Yes" is stored in this column, such route switching is enabled; if a letter string "No" is stored, it indicates that such route switching is disabled.

For example, in a case where the second network control entity 160 in a hub area 2 where a user resides carries out communication that entails source address translation using a NAT (Network Address Translation) function or the like, the source address is subject to change due to communication route switching. As a result, a problem occurs that the session of TCP (Transmission Control Protocol) is disconnected and the ongoing service cannot continue to be used. To avoid this problem, the source address change enable/disable flag is used to control communication route switching by the flag indicating whether communication route switching that entails source address change is enabled or disabled.

Returning to FIG. 2, in the link in use information storage area 114, link in use information identifying a link (WAN 190) that a user in each hub area 2 uses when receiving the user's contracted service provided is stored. In the present embodiment, for example, a link in use information table 114a is stored which is illustrated in FIG. 5 (an overview diagram of a link in use information table 114a).

The link in use information table 114a has a contract ID column 114b, link being used now column 114c, and bandwidth in use column 114d.

In the contract ID column 114b, information identifying each contract under which a service is provided via a service providing server 140 is stored. Here, in the present embodiment, as the information identifying each contract, a contract ID is stored which is identification information to uniquely identify each contract.

In the link being used now column 114c, information identifying a link (WAN 190) that is used when receiving a service provided under the contract identified in the contract ID column 114b is stored. Here, in the present embodiment, as the information identifying a link (WAN 190), a link ID is stored which is identification information to uniquely identify each link (WAN 190).

In the bandwidth in use column 114d, information specifying an upper limit bandwidth that is used when receiving a service provided under the contract identified in the contract ID column 114b is stored.

Returning to FIG. 2, in the trouble ticket information storage area 115, trouble ticket information identifying a failure (including quality degradation) occurred in the network control system 100 is stored. In the present embodiment, for example, a trouble ticket information table 115a is stored which is illustrated in FIG. 6 (an overview diagram of a trouble ticket information table 115a).

The trouble ticket information table 115a has a ticket ID column 115b, date/time of detection column 115c, date/time of recovery column 115d, status column 115e, user hub area ID column 115f, trouble ID column 115g, and trouble detail column 115h.

In the ticket ID column 115b, information identifying each failure (including quality degradation) occurred in the network control system 100 is stored. Here, in the present embodiment, as the information identifying a failure, a ticket ID is stored which is identification information to uniquely identify each trouble.

In the date/time of detection column 115c, information specifying date/time when the failure identified in the ticket ID column 115b was detected is stored.

In the date/time of recovery column 115d, information specifying date/time when the failure identified in the ticket ID column 115b was recovered is stored.

In the status column 115e, information specifying a status of dealing with the trouble identified in the ticket ID column 115b is stored. Here, in the present embodiment, as the information specifying a status of dealing with the trouble, any of the following letter strings may be stored: "detected" indicating that a trouble has been detected and a remedy against the trouble is going to be taken; "remedied" indicating that the detected failure has been remedied (by link assignment);

"impossible to remedy" indicating that it was impossible to remedy the detected failure (by link assignment); and "recovered" indicating recovery from the detected failure with the result that the link in use returned to the default link (the link identified in the default link ID column 113f in the contract information table 113a).

In the user hub area ID column 115f, information identifying a hub area 2 where the trouble identified in the ticket ID column 115b was detected is stored. Here, in the present embodiment, as the information identifying a hub area 2, a hub area ID is stored which is identification information to uniquely identify each hub area.

In the trouble ID column 115g, information identifying a type of the trouble identified in the ticket ID column 115b is stored. Here, in the present embodiment, as the information identifying a type of the trouble, a failure ID uniquely assigned according to failure type is stored. Exemplified in FIG. 6, a failure ID "101" denotes "communication disabled" and a failure ID "201" denotes "response time deteriorated".

In the trouble detail column 115h, information specifying what is the trouble identified in the trouble ticket ID column 115b is stored.

Returning to FIG. 2, the control unit 117 includes an overall controller 118, a quality monitor 119, and a control decision part 120.

The overall controller 118 controls all processes in the network management station 110.

The quality monitor 119 receives quality information from at least either of a second network control entity 160 and a first network control entity 130 via the communication unit 124 which will be described later and monitors communications in the network control system 100.

For example, in the present embodiment, the quality monitor 119 monitors the response time and bandwidth of each link (WAN 190) based on the quality information received from at least either of the second network control entity 160 and the first network control entity 130 and monitors whether quality degradation occurs in the link (WAN 190).

Also, the quality monitor 119 performs a task of storing response time and bandwidth per link included in the quality information received from at least either of the second network control entity 160 and the first network control entity 130 into the response time column 112h and the throughput column 112g, respectively, of a record in which the link ID identified in the quality information is stored in the link ID column 112c in the contract link information table 112a.

The control decision part 120 controls tasks of determining a remedy in a case where quality degradation occurs in a link (WAN 190), as determined by the quality monitor 119, and transmitting a control command to the second network control entity 160 via the communication unit 124.

The input unit 122 takes input of information.

The output unit 123 outputs information.

The communication unit 124 transmits and receives information via the LAN 150.

Figure 7:
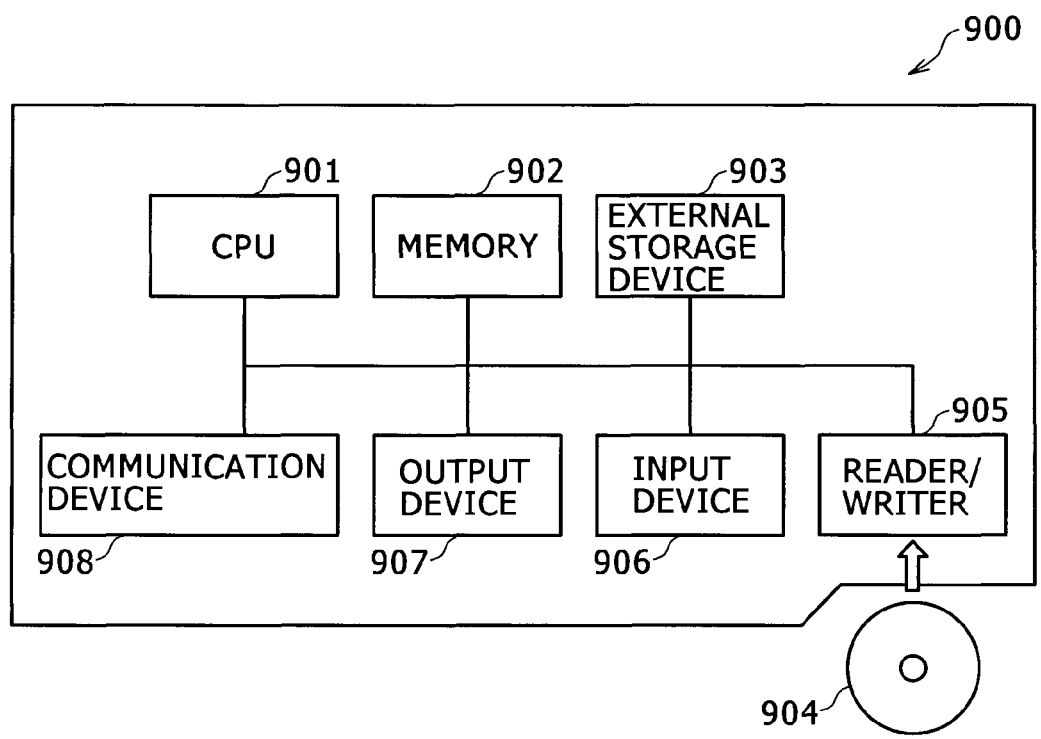
FIG. 7 is a diagram illustrating an overview of a computer.

The above-described network management station 110 can be embodied in a general computer 900, for example, as is shown in FIG. 7 (an overview diagram of a computer 900), including a CPU (Central Processing Unit) 901, a memory 902, an external storage device 903 such as an HDD (Hard Disk Drive), a reader/writer 905 which reads and writes information from/to a portable storage medium 904 such as a CD (Compact Disk) and a DVD (Digital Versatile Disk), and input device 906 such as a keyboard and a mouse, an output device 907 such as a display, and a communication device 908 such as an NIC (Network Interface Card) for coupling to a communication network.

For example, the storage unit 111 can be realized through the use or the memory 902 or the external storage device 903 by the CPU 901; the control unit 117 can be realized by loading a prearranged program stored in the external storage device 903 to the memory 902 and executing the program by the CPU 901; the input unit 122 can be realized through the use of the input device 906 by the CPU 901; the output unit 123 can be realized through the use of the output device 907 by the CPU 901; and the communication unit 124 can be realized through the use of the communication device 908 by the CPU 901.

The prearranged program may be loaded from the storage medium 904 via the reader/writer 905 or loaded from a network via the communication device 908 to the external storage device 903 and then loaded to the memory 902 and executed by the CPU 901. Alternatively, the program may be loaded from the storage medium 904 via the reader/writer 905 or loaded from a network via the communication device 908 directly to the memory 902 and executed by the CPU 901.

The first network control entity 130 is a relay node having a gateway function that makes a protocol conversion between the WAN 190 and the LAN 150.

The first network control entity 130 performs tasks of monitoring a communication status of communication data transmitted and received via the WAN 190, generating quality information that specifies the communication status of the communication data at a predetermined time, and transmitting that information to the network management station 110, as is the case with a quality measurement part 167 of the second network control entity 160 which will be described later.

The service providing servers 140 are the servers that provide predetermined services to user terminals 170 via the networks (LAN 150, WAN 190).

Figures 8, 9:
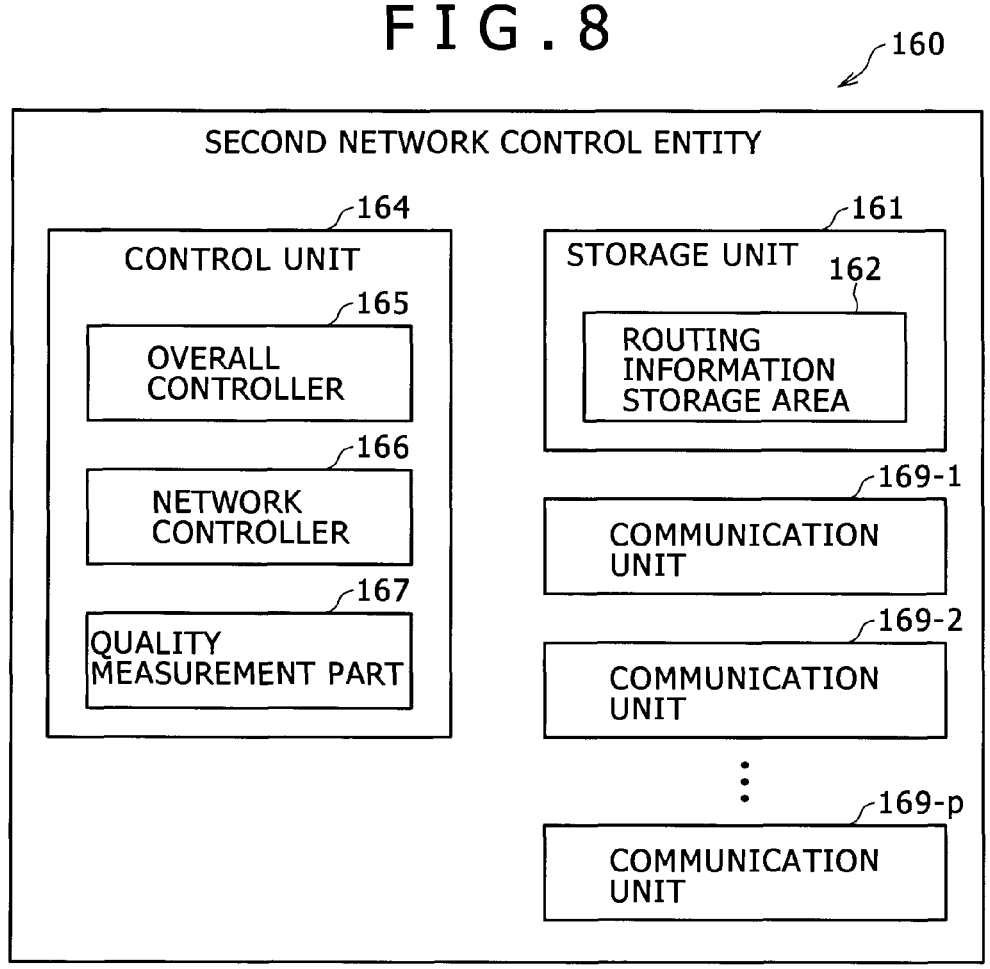
FIG. 8 is a diagram illustrating an overview of a second network control entity.
FIG. 9 is a diagram illustrating an overview of a routing information table.

FIG. 8 is an overview diagram of the second network control entity 160. As shown here, the second network control entity 160 includes a storage unit 161, a control unit 164, and communication units 169-1, . . . , 169-p (where p is a natural number of 2 or more; they may be referred to as a communication unit(s) 169 in a context that distinguishing each is not needed).

Here, it is assumed that the communication unit 169-1 is coupled to the LAN 180 and communication units 169-2 to 169-p are coupled to the WAN 190.

The storage unit 161 includes a routing information storage area 162.

In the routing information storage area 162, information identifying a communication data routing link (WAN 190) is stored. In the present embodiment, for example, a routing information table 162a is stored which is illustrated in FIG. 9 (an overview diagram of the routing information table 162a).

The routing information table 162a has a destination address column 162b, destination port number column 162c, link ID column 162d, network interface column 162e, priority column 162f, and bandwidth in use column 162g.

In the destination address column 162b, information identifying a communicative address of a destination to which communication data is transmitted is stored.

In the destination port number column 162c, information identifying a port number of a destination to which communication data is transmitted is stored.

In the link ID column 162d, information identifying a link (WAN 190) that is used when transmitting communication data to the destination identified in the destination address column 162b and the destination port number column 162c is stored. Here, in the present embodiment, as the information identifying a link (WAN 190), a link ID is stored which is identification information to uniquely identify each link (WAN 190).

In the network interface column 162e, information identifying an interface that is used when transmitting communication data to the destination identified in the destination address column 162b and the destination port number column 162c is stored.

In the priority column 162f, information specifying a priority level of communication data that is transmitted to the destination identified in the destination address column 162b and the destination port number column 162c is stored. Here, in the example, as the information specifying a priority level, a natural number is stored. The smaller the natural number, the higher will be the priority level. However, ordering of priority is not restricted to this manner. Priority levels stored in this priority column 162f correspond to the priority levels stored in the priority among communications in the hub area column 113j of the service contract information table 113a.

In the bandwidth in use column 162g, information specifying a maximum bandwidth of the link (WAN 190) that is used when transmitting communication data to the destination identified in the destination address column 162b and the destination port number column 162c is stored. Bandwidths stored in this bandwidth in use column 162g correspond to the bandwidths stored in the bandwidth in use column 113g of the service contract information table 113a.

Returning to FIG. 8, the control unit 164 includes an overall controller 165, a network controller 166, and a quality measurement part 167.

The overall controller 165 controls all processes in the second network control entity 160. For example, in the present embodiment, it handles a protocol conversion between the WAN 190 and the LAN 150, 180.

The network controller 166 performs a task of forwarding communication data, based on the routing information table 162a.

The quality measurement part 167 performs tasks of monitoring a communication status of communication data transmitted and received via the communication units 169-2 to 169-p, generating quality information that specifies the communication status of the communication data at a predetermined time, and transmitting that information to the network management station 110.

For example, in the present embodiment, according to a known method such as PING, the quality measurement part 167 takes measurements of RTT (Round Trip Time) between the second network control entity 160 and the first network control entity 130 situated in the service center 1 for all WANs 190 coupled to the communication units 169-2 to 169-p periodically (e.g., at intervals of 2 seconds) and temporarily stores an average of the RTT measurements taken by a predetermined number of times (e.g., five times), together with a link ID and date/time of measurement, into the storage unit 161.

Here, the date/time of measurement may be any time instant between the first measurement and the last measurement to be taken by the predetermined number of times or a time instant at which the measurement data has been stored into the storage unit 161. In the present embodiment, the date/time of measurement is assumed to be a time instant at which the measurement data has been stored into the storage unit 161.

The link IDs of the WANs 190 coupled to the communication units 169-2 to 169-p are assumed to have been registered beforehand in the storage unit 161 of the second network control entity 160. Further, it is assumed that, in case RTT measurements cannot be performed, as communication with the service center 1 is disabled due to a failure or the like of the WAN 190, a predetermined letter string (e.g., "UNREACHABLE") is stored into the storage unit 161, instead of an RTT value.

According to a known method such as FTP (File Transfer Protocol), a file of a given size is downloaded from the first network control entity 130 or the network management station 110 situated in the service center 1 to the second network control entity 160 through each link for all WANs 190 coupled to the communication units 169-2 to 169-p periodically (e.g., at intervals of one hour) or during a low traffic time. Time taken for the downloading is measured. An average of the measurements taken by a predetermined number of times (e.g., two times) is temporarily stored, together with a link ID and date/time of measurement, into the storage unit 161.

Here, the date/time of measurement may be any time instant between the first measurement and the last measurement to be taken by the predetermined number of times or a time instant at which the measurement data has been stored into the storage unit 161. In the present embodiment, the date/time of measurement is assumed to be a time instant at which the measurement data has been stored into the storage unit 161.

Further, it is assumed that, in case throughput measurements cannot be performed, as communication with the service center 1 is disabled due to a failure or the like of the WAN 190, a predetermined letter string (e.g., "UNREACHABLE") is stored into the storage unit 161, instead of a throughput value.

Then, the quality measurement part 167 generates quality information in which an RTT of each link measured periodically (e.g., at intervals of one minute) is given as a response time and a value calculated from time taken for download through each link and the file size is given as a throughput and transmits that information to the network management station 110.

The quality information should include a hub area ID and at least either of response time information and throughput information. Here, the response time information includes link IDs, the response times of the links (WANs 190) identified by the link IDs, and date/time of each measurement. The throughput information includes link IDs, the throughputs of the links (WANs 190) identified by the link IDs, and date/time of each measurement. However, quality information that is transmitted at a time is assumed to convey one piece of response information and/or throughput information for each of the links (WANs 190) identified by the link IDs. Therefore, it is impossible to transmit two pieces of response time information for a particular WAN 190.

Hub area IDs area assumed to have been registered beforehand in the storage unit 161 of the second network control entity 160.

Further, the measurement intervals of response time and throughput may differ and each of information may be transmitted separately. For the WANs 190 coupled to the communication units 169-2 to 169-p, quality information measured respectively for each WAN may be transmitted separately.

As the WAN 190 to be used when transmitting quality information, the dedicated WAN 190 may be provided and used or any link capable of communication with the service center 1 among the WANs 190 coupled to the communication units 169-2 to 169-p information may be used. For example, in the present embodiment, it is assumed to use the WAN 190 whose response time is shortest among the WANs 190 coupled to the communication units 169-2 to 169-p. In case all the WANs 190 coupled to the communication units 169-2 to 169-*p* are incapable of communication with the service center 1 due to their failure or the like, a known method such as PING should be carried out to make one or more WANs 190 capable of communication with the service center 1. After that, the WAN 190 made capable of communication should be used to transmit quality information.

The communication unit 169-1 transmits and receives information via the LAN 180.

The communication units 169-2 to 169-*p* transmit and receive information via the WAN 190.

The above-described second network control entity 160 can be embodied in a computer 900 as shown in FIG. 7.

For example, the storage unit 161 can be realized through the use of the memory 902 or the external storage device 903 by the CPU 901; the control unit 164 can be realized by loading a prearranged program stored in the external storage device 903 to the memory 902 and executing the program by the CPU 901; and the communication units 169 can be realized through the use of the communication device 908 by the CPU 901.

The prearranged program may be loaded from the storage medium 904 via the reader/writer 905 or loaded from a network via the communication device 908 to the external storage device 903 and then loaded to the memory 902 and executed by the CPU 901. Alternatively, the program may be loaded from the storage medium 904 via the reader/writer 905 or loaded from a network via the communication device 908 directly to the memory 902 and executed by the CPU 901.

Communication devices 908 as many as the number of LAN 180*s* and WANs 190 should be provided.

In the system structural diagram (FIG. 1), each of the functions of the stations 110, 130, 160 and servers 140 may be embodied such that the processing units of each are distributed across a plurality of entities without being integrated in a single entity. These functions may be provided separately by a plurality of companies.

Figure 10:
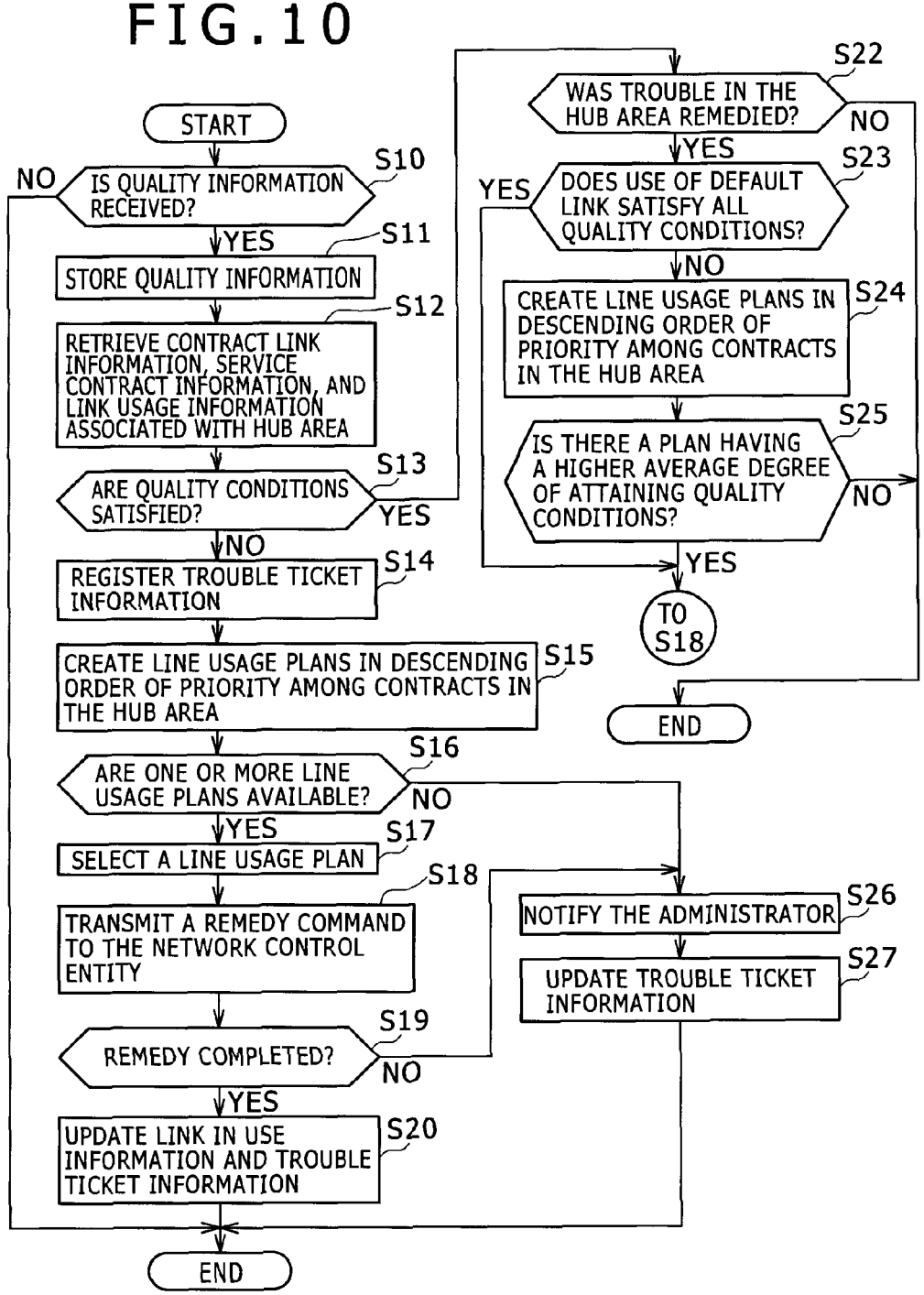
FIG. 10 is a flowchart illustrating a process that is performed in the network management station.

FIG. 10 is a flowchart illustrating a process that is performed in the network management station 110.

First, when the quality monitor 119 receives quality information from the second network control entity 160 or the first network control entity 130 via the communication unit 124 (Yes in S10), in the contract link information table 112*a*, the quality monitor 119 locates records in which the link IDs included in the received quality information are stored in the link ID column 112*c*. The quality monitor 119 stores response time, throughput, and date/time of measurement per link included in the quality information into the response time column 112*h*, throughput column 112*g*, and latest measurement date/time column 112*i* of the records, respectively, in the contract link information table 112*a*, and, moreover, stores the date/time of storing the above items of information into the update date/time column 112*j* as update date/time (S11). In the latest measurement date/time column 112*i*, the latest date/time of measurement included in the received quality information in terms of the quality information related to the link ID should be stored.

Then, the quality monitor 119 retrieve information stored in one or more records associated with the hub area identified by the hub area ID included in the received quality information from the contract link information table 112*a*, service contract information table 113*a*, and link usage information table 114*a* (S12).

For example, in the contract link information table 112*a*, the control decision part 120 locates one or more records in which the hub area ID included in the received quality information is stored in the user hub area ID column 112*b* and retrieves information stored in the located records.

Similarly, in the service contract information table 113*a*, the control decision part 120 locates one or more records in which the hub area ID included in the received quality information is stored in the user hub area ID column 113*c* and retrieves information stored in the located records.

Further, in the link usage information table 114*a*, the control decision part 120 locates one more records in which the contract IDs in the contract ID column 113*b* included in the records located in the service contract information table 113*a* are stored in the contract ID column 114*b* and retrieves information stored in the located records.

Next, with regard to all contracts of services provided in the hub area, identified in the step S12, the quality monitor 119 determines whether the values stored in the response time column 112*h* and throughput column 112*g* of the records in the contract link information table 112*a* satisfy the quality conditions defined in the service contract information table 113*a* (S13). If at least either of response time and bandwidth does not satisfy the quality conditions (No in step S13), the quality monitor 119 goes to step S14; if response time and bandwidth included in the quality information satisfies the quality conditions (Yes in step S13), the quality monitor 119 goes to step S22.

For example, determination as to whether the quality condition about response time is satisfied can be implemented as follows.

For each of the contracts of services provided in the hub area, identified in the step S12, the quality monitor 119 first identifies the link ID of the link being used now from the link being used now column 114*c* of the link usage information table 114*a*.

From the contract link information table 112*a*, the quality monitor 119 then locates a record in which the identified link ID of the link being used now is contained in the link ID column 112*c* and identifies the response time 112*h* in the record.

From the service contract information table 113*a*, the quality monitor 119 further locates a record in which the same value in the contract ID column 114*b* of the link usage information table 114*a* is stored in the contract ID column 113*b* and identifies the minimum response time column 113*h* in the record. If the response time of the link being used now is larger than the minimum response time stored in the minimum response time column 113*h* thus identified, the quality monitor 119 determines that the response time of the link does not satisfy the quality condition.

Determination as to whether the quality condition about bandwidth is satisfied can be implemented as follows.

From the contract link information table 112*a*, the quality monitor 119 first identifies the link ID and throughput of each link from the link ID column 112*c* and the throughput column 112*g* of the records of the contract links in the hub area, identified in the step S12.

From the link usage information table 114*a*, the quality monitor 119 then locates records in which the link being used now column 114*c* has the identified link ID from the link ID column 112*c* and calculates a total of the bandwidths stored in the bandwidth in use column 114*d* for each link.

If the throughput identified from the contract link information table 112*a* is smaller than the total bandwidth value identified from the link usage information table 114*a*, the quality monitor 119 determines that the throughput of the link does not satisfy the quality condition. At step S14, the quality monitor 119 creates and registers new trouble ticket information into the trouble ticket information table 115*a* and notifies the control decision part 120 of the created trouble ticket information and the information contained in the records retrieved in the step S12. Even in a case where trouble ticket information related to the user hub area already exists with "remedied", "detected", or "impossible to remedy" annotated in the status column, the quality monitor 119 should create new trouble ticket information.

Here, the quality monitor 119 stores date/time at any time instant between the acquisition of quality information and the registration into the trouble ticket information table 115a in the date/time of detection column 115c, a mark "–" in the date/time of recovery column 115d, a letter string "detected" in the status column 115e, the hub area ID derived from the quality information in the user hub area ID column 115f, a code "201" in the trouble ID column 115g, and an item that does not satisfy a quality condition in the trouble detail column 115h. In the trouble detail column 115h, it stores, for example, the unsatisfied item (e.g., "response"), the value in the contract ID column 113b of the record relevant to the contract that is not satisfied in the service contract information table 113a, the threshold value (e.g., the value in the minimum response time column 113h of the relevant record in the service contract information table 113a), and the measured value (e.g., the value of the response time 112h in the contract link information table 112a).

Then, the control decision part 120 retrieves priority levels of communications in the hub area from the priority among communications in the hub area column 113j from the records associated with the hub area 2 and retrieved from the service contract information table 113a in the step S12 and creates a link usage plan for communication links to be used to access the contracted services in descending order of priority with regard to the retrieved priority levels (S15).

For example, the control decision part 120 first puts the contract IDs retrieved from the service contract information table 113a in descending order of priority. In the example of FIG. 4, the contract IDs are put in order of "A-1-b", "A-1-c", and "A-1-a".

Then, the control decision part 120 assigns a link that satisfies selecting conditions to each of the contracts in order of priority. Here, the control decision part 120 determines that a link satisfies the selecting conditions, if it satisfies all the following link assignment conditions (1) to (3).

(1) In a record of the object contract ID in the service contract information table 113a, the control decision part 120 identifies the minimum response time stored in the minimum response time column 113h. In the contract link information table 112a, for at least one of the contract links for users in the hub area 2, the response time stored in the response time column 112h is less than the minimum response time identified.

(2) For at least one of the contract links for users in the hub area 2, the unoccupied bandwidth of the link (bandwidth remaining after subtracting the already assigned bandwidth from the throughput (bandwidth) stored in the throughput column 112g of the contract link information table 112a) is more than the bandwidth in use stored in the bandwidth in use column 113g or the minimum ensured bandwidth in case of emergency stored in the minimum ensured bandwidth in case of emergency column 113i of the record of the object contract ID in the service contract information table 113a.

(3) In the record of the object contract ID in the service contract information table 113a, the source address change enable/disable flag column 113k contains "Yes". Or, when the value of the source address change enable/disable flag column 113k in the record of the object contract ID is "No", no change from the link being used now is made.

For example, in the examples illustrated in FIG. 3 and FIG. 4, first, for the contract with ID "A-1-b" which is of the highest priority, the control decision part 120 determines that the hub area ID associated with the contract ID "A-1-b" is "A-i" in the service contract information table 113a and the contract links provided in hub are ID "A-1" are "A-1-1" and "A-1-2" in the contract link information table 112a.

If the response time associated with the link ID "A-1-1" in the contract link information table 112a is "210" and the response time associated with the link ID "A-1-2" in the contract link information table 112a is "100", the control decision part 120 determines that the link with ID "A-1-1" does not satisfy the minimum response time "200" defined for the contract with ID "A-1-b" (the link does not satisfy the selecting conditions).

On the other hand, the unoccupied capacity of the link with ID "A-1-2" satisfies the bandwidth in use "30M" for the contract with ID "A-1-b", as the throughput of the link is "50M" from the contract link information table 112a. Hence, the control decision part 120 assigns a bandwidth of "30M" of the link with ID "A-1-2" to the contract with ID "A-1-b".

Then, for the contract with ID "A-1-c" which is of the second priority, the control decision part 120 determines that links satisfying the minimum response time "500" defined for the contract with ID "A-1-c" are, for example, the links with IDs "A-1-1" and "A-1-2" from the contract link information table 112a.

The unoccupied capacity of the link with ID "A-1-1" satisfies the bandwidth in use "30M" for the contract with ID "A-1-c", as the throughput of the link is "600M" from the contract link information table 112a. Hence, the control decision part 120 assigns a bandwidth of "30M" of the link with ID "A-1-1" to the contract with ID "A-1-c".

Moreover, the unoccupied capacity of the link with ID "A-1-2" is "20M" that remains after subtracting the bandwidth in use "30M" for the contract with ID "A-1-b" from the throughput "50M" of the link from the contract link information table 112a. Hence, the control decision part 120 assigns a bandwidth of "10M" of the link with ID "A-1-2" as the minimum ensured bandwidth in case of emergency to the contract with ID "A-1-c".

Then, for the contract with ID "A-1-a" which is of the third priority, the control decision part 120 determines that a link satisfying the minimum response time "200" defined for the contract with ID "A-1-a" is, for example, the link with ID "A-1-2" from the contract link information table 112a.

The unoccupied capacity of the link with ID "A-1-2" is "20M" that remains after subtracting the bandwidth in use "30M" for the contract with ID "A-1-b" from the throughput "50M" of the link from the contract link information table 112a or "10M" that remains after subtracting the bandwidth in use "30M" for the contract with ID "A-1-b" and the minimum ensured bandwidth in case of emergency "10M" for the contract with ID "A-1-c" from the throughput "50M" of the link. Hence, in each case, the control decision part 120 assigns a bandwidth of "10M" of the link with ID "A-1-2" as the minimum ensured bandwidth in case of emergency to the contract with ID "A-1-a".

Finally, the control decision part 120 calculates a degree of attaining quality conditions, an average degree of attaining quality condition, and the number of times of route switching for each link usage plan and stores them in their corresponding columns.

Through the above processing in the examples illustrated in FIG. 3 and FIG. 4, the control decision part 120 can create two link usage plans which are illustrated in FIG. 11 (an overview diagram of a link usage plan table 120a).

The link usage plan table 120a has a remedy ID column 120b, contract ID column 120c, link being used now column 120d, link to be used after change column 120e, bandwidth being used now column 120f, bandwidth to be used after change column 120g, degree of attaining quality conditions column 120h, average degree of attaining quality conditions column 120i, and number of times of route switching column 120j.

In the remedy ID column 120b, information identifying a link usage plan is stored. Here, in the present embodiment, as the information identifying a link usage plan, a remedy ID is stored which is identification information to uniquely identify each link usage plan.

In the contract ID column 120c, information identifying contracts provided in the hub area 2 for which the control decision part created the link usage plan identified in the remedy ID column 120b is stored. Here, in the present embodiment, as the information identifying contracts, contract IDs are stored which are identification information to uniquely identify each contract.

In the link being used now column 120d, information identifying links being used to provide services under the contracts identified in the contract ID column 120c is stored. Here, in the present embodiment, as the information identifying links, link IDs to uniquely identify each link are stored.

In the link to be used after change column 120e, information identifying links (planned) to be used to provide services under the contracts identified in the contract ID column 120c in the link usage plan identified in the remedy ID column 120b is stored. Here, in the present embodiment, as the information identifying links, link IDs to uniquely identify each link are stored.

In the bandwidth being used now column 120f, information specifying bandwidths being used by the links being used to provide services under the contracts identified in the contract ID column 120c is stored.

In the bandwidth to be used after change column 120g, information specifying bandwidths assigned to the links identified in the link to be used after change column 120e in the link usage plan identified in the remedy ID column 120b is stored.

In the degree of attaining quality conditions column 120h, information specifying the degrees of attaining quality conditions by the links identified in the link to be used after change column 120e in the link usage plan identified in the remedy ID column 120b is stored.

For example, in the present embodiment, the degree of attaining quality conditions for each of the links identified in the link to be used after change column 120e is calculated in terms of added values; i.e., 10 points are added if the link satisfies its minimum response time, 10 points are added if the link satisfies its bandwidth in normal use, and 5 points are added if the link do not satisfy its bandwidth in normal use and if the link satisfies its minimum ensured bandwidth in case of emergency.

In the average degree of attaining quality conditions column 120i, information specifying an average of the degrees of attaining quality conditions per link specified in the degree of attaining quality conditions column 120h in the link usage plan identified in the remedy ID column 120b is stored.

In the number of times of route switching column 120j, information specifying the number of link changes from the links being used now, identified in the link being used now column 120d, to the links to be used after change, identified in the link to be used after change column 120e, in the link usage plan identified in the remedy ID column 120b, is stored.

Returning to FIG. 10, at step S16, the control decision part 120 confirms whether at least one or more link usage plans are available. If the link usage plans are available (Yes in step S16), the control decision part 120 goes to step S17; if no link usage plan is available (No in step S16), the control decision part 120 goes to step S26.

Then, the control decision part 120 selects one link usage plan from the one or more link usage plans (S17). Here, it selects a link usage plan having the highest average degree of attaining quality conditions; if the average degree of attaining quality conditions is equal for all candidate plans, it selects a plan for which the number of times of route switching is smaller. However, if both the average degree of attaining quality conditions and the number of times of route switching are equal for all candidate plans, it may select an arbitrary link usage plan. If one link usage plan is only available, it selects that plan.

At step S18, based on one link usage plan selected, the control decision part 120 transmits remedy command information to request the transmission of communication data through the links identified in the link usage plan to the second network control entity 160 situated in the hub area 2 for which it created the link usage plan (S18).

For example, the control decision part 120 locates records in which the contract IDs identified in the link usage plan are stored in the contract ID column 113b in the service contract information table 113a and generates remedy command information specifying at least information stored in the service access information columns 113e of the located records, the link IDs stored in the link to be used after change column 120e in the link usage plan and associated with the contract IDs, and the bandwidths stored in the bandwidth to be used after change column 120g in the link usage plan and associated with the contract IDs, and transmits the remedy command information to the second network control entity 160.

Next, the control decision part 120 determines whether the remedy has been completed in the second network control entity 160, based on the remedy information transmitted in the step S18 (S19). If the remedy has not been completed (No in step S19), the control decision part 120 goes to step 26; if the remedy has been completed (Yes in step S19), the control decision part 120 goes to step 20. This determination is made, for example, by receiving a remedy result (e.g., route change completed) from the second network control entity 160.

Then, the control decision part 120 updates the link in use information table 114a and the trouble ticket information table 115a, based on the adopted link usage plan 120a (S20).

For example, the control decision part 120 retrieves a record of the link usage plan 120a in which the adopted remedy ID is stored in the remedy ID column 120b. Then, in the link in use information table 114, the control decision part 120 locates records having the contract IDs 114b matching the contract IDs 120c in the retrieved record and stores the links to be used after change 120e and the bandwidths to be used after change 120g in the link usage plan into the link being used now column 114c and the bandwidth in use 114d or the records, respectively.

The control decision part 120 further updates the trouble ticket information table 115a by storing a letter string "remedied" in the status column 115e of the new record registered in the step S14 in the trouble ticket information table 115a.

On the other hand, if the quality conditions of the links are satisfied, as determined in the step S13 (Yes in step S13), the control decision part 120 determines whether a trouble was remedied for the links in the trouble ticket information table 115a (here, a letter string "remedied", "detected" or "impossible to remedy" may be stored) (S22). If a trouble was remedied for the links (Yes in step 22), the control decision part 120 goes to step S23; if no remedy was taken for the links (No in step 22), the control decision part 120 terminates the process.

Then, the control decision part 120 determines whether the default links identified in the default link ID column 113f in the service contract information for the hub area 2, retrieved from the service contract information table 113a in the step S12, satisfy the quality conditions, using the bandwidths specified in the bandwidth in use column 113g (S23). If the default links satisfy the quality conditions, the control decision part 120 creates a link usage plan using the default links identified in the default link ID column 113f and the bandwidths specified in the bandwidth in use column 113g, goes to step S18, and transmits the remedy command to the second network control entity 160 (Yes in step S23). Subsequent steps S19 and S20 are the same as described above. However, in the step S20, when updating the trouble ticket information table 115a, the control decision part retrieves one or more records in which the status column 115e contains "remedied", "detected" or "impossible to remedy" among the records in which the ID of the hub area is stored in the hub area ID column 115f and stores a letter string "recovered" in the status column 115e of the records, thus updating the trouble ticket information table 115a.

At the step S23, otherwise, if the default links do not satisfy the quality conditions (No in step S23), the control decision part 120 goes to step S24.

At step S24, the control decision part 120 then creates link usage plans in the same manner as in the step S15 (S24).

Then, the control decision part 120 recalculates an average degree of attaining quality conditions with the links being used now, based on the link in use information for the hub area retrieved from the link in use information table 114a in the step S12 and compares this average degree with each of the average degrees of attaining quality conditions specified in the average degree of attaining quality conditions column 120i for the link usage plans created in the step S24 (S25). If there is a link usage plan for which a higher average degree of attaining quality conditions than the average degree of attaining quality conditions with the links being used now is stored in the average degree of attaining quality conditions column 120i (Yes in step S25), the control decision part 120 executes the remedy based on that link usage plan by the same processing as in the steps S18 to S20. However, it does not update the status column 115e of the trouble ticket information table 115a in the step S20.

Otherwise, if there is no link usage plan for which a higher average degree of attaining quality conditions than the average degree of attaining quality conditions with the links being used now is stored in the average degree of attaining quality conditions column 120i (No in step S25), the control decision part 120 terminates the process.

At step S26, the control decision part 120 notifies the administrator, e.g., by causing the output unit 123 to display a predetermined error notification or the like (S26).

Then, the control decision part 120 updates the trouble ticket information table 115a the by storing a letter string "impossible to remedy" in the status column 115e of the new record registered in the step S14 in the trouble ticket information table 115a (S27).

As described above, in a situation where, from within hub areas 2 in multi-home environment, access to a plurality of services is performed using a plurality of WANs 190, when the quality of the WAN 190 has degraded, the quality can be maintained as much as possible by performing at least either of route switching and bandwidth reassignment based on priority among communications for the services and required bandwidths.

Next, a second embodiment is described. The following description relates to a network management station according to the second embodiment, because the network management station differs from that in the first embodiment.

Here, in the first embodiment, switching of the links (WANs) is performed when quality degradation occurs, taking priority among communications in a hub area 2 into account. However, for example, in case a failure has occurred in a WAN 190-A (where A is a natural number such that $1 \leq A \leq m$), it affects a plurality of hub areas 2. In this case, switching of communications in each hub area 2 to another WAN 190-B (where B is a natural number such that $1 \leq B \leq m$ and $A \neq B$) other than the WAN 190-A has been done as in the first embodiment, overload is imposed on the communication capacity of the access network between the WAN 190-B and the service center 1 after the switching and there is a risk that degradation occurs even in the quality of communications using the WAN 190-B.

In the second embodiment, a description is provided for a link switching technique, taking priority among the hub areas into account.

Figure 12:
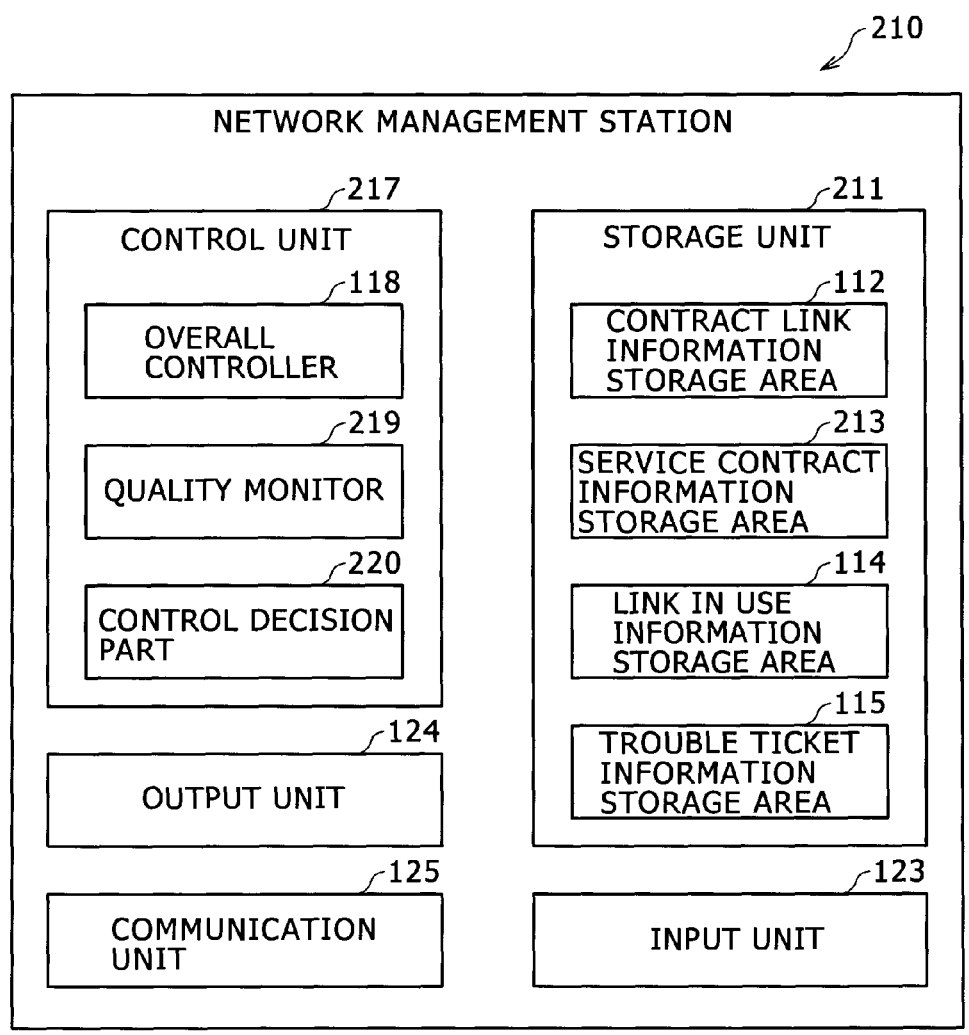
FIG. 12 is a diagram illustrating an overview of a network management station.

FIG. 12 is an overview diagram of a network management station 210 in the second embodiment. As shown here, the network management station 210 includes a storage unit 211, a control unit 217, an input unit 122, an output unit 123, and a communication unit 124. The following description relates to the storage unit 211 and the control unit 217 which differ from those in the first embodiment.

The storage unit 211 includes a contract link information storage area 112, a service contract information storage area 213, a link in use information storage area 114, and a trouble ticket information storage area 115. The following description relates to the service contract information storage area 213 which differs from the corresponding area in the first embodiment.

In the service contract information storage area 213, service contract information specifying a user's contracted service for a user residing in each hub area 2 and communication conditions for accessing the service is stored. In the present embodiment, for example, a service contract information table 213a is stored which is illustrated in FIG. 13 (an overview diagram of a service contract information table 213a).

The service contract information table 213a has a contract ID column 213b, user hub area ID column 213c, contracted service column 213d, service access information column 213e, default link ID column 213f, bandwidth in use column 213g, minimum response time column 213h, minimum ensured bandwidth in case of emergency column 213i, priority among communications in the hub area column 213j, source address change enable/disable flag column 213k, and average response time column 213l. In contrast with the first embodiment, the average response time column 213l is added and, therefore, an explanation is provided about the average response time column 213l.

In the average response time column 213l, information specifying an average value of response time (average response time) during a certain period (e.g., one month) is stored.

As an item of contract about quality, for example, the contract may provide that "a monthly average delay time should be less than 100 ms". Accordingly, in the present embodiment, as an example, a monthly average response time is recorded and the minimum response time stored in the minimum response time column 213h is treated as a threshold value of average response time for the contract service.

Returning to FIG. 12, the control unit 217 includes an overall controller 118, a quality monitor 219, and a control decision part 220. Because the quality monitor 219 and the control decision part 220 performs processing in a different manner, as compared with the first embodiment, the following description relates to the quality monitor 219 and the control decision part 220.

The quality monitor 219 in the present embodiment receives quality information from a second network control entity 160 via the communication unit 124 and monitors communications in the network control system 100.

For example, in the present embodiment, the quality monitor 219 monitors the response time and throughput of each link (WAN 190) according to the quality information received from a second network control entity 160 and monitors whether quality degradation occurs in the link (WAN 190).

Also, the quality monitor 119 performs a task of storing response time, throughput, and date/time of measurement per link included in the quality information received from a second network control entity 160 into the response time column 112h throughput column 112g, and latest measurement date/time column 112i, respectively, of a record in which the link ID identified in the quality information is stored in the link ID column 112c in the contract link information table 112a.

Upon receiving the quality information from a second network control entity 160, the quality monitor 219 further performs a task of updating an average value of response time (average response time) stored in the average response time column 213l of the service contract information table 213a, using the response time included in the received quality information.

The control decision part 220 in the present embodiment controls tasks of determining a remedy to be taken in each of hub areas in descending order of priority in a case that quality degradation occurs in a link (WAN 190), as determined by the quality monitor 119, and transmitting a control command to the second network control entity 160 residing in the area via the communication unit 124.

Figure 14:
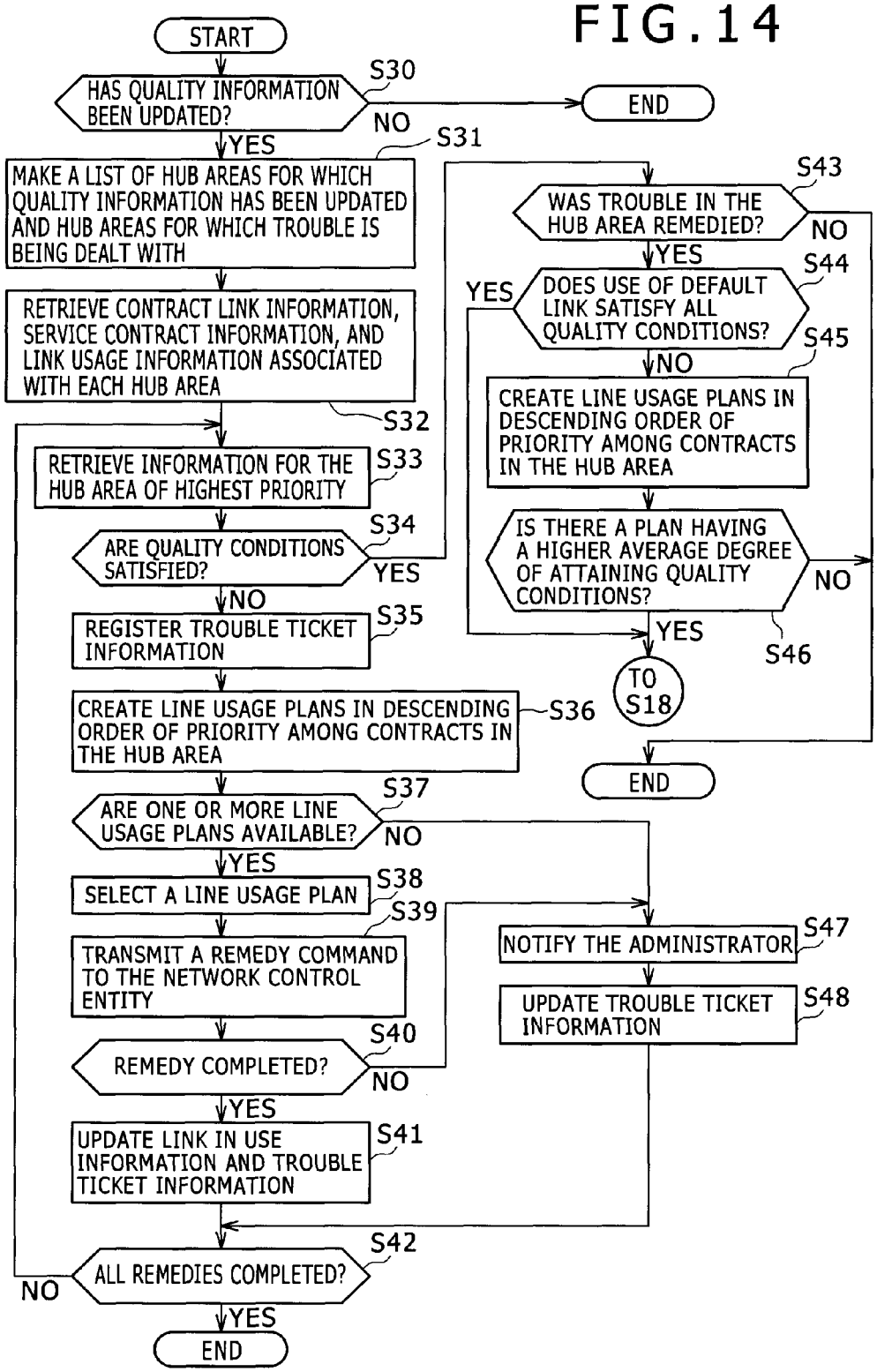
FIG. 14 is a flowchart illustrating a process that is performed in the network management station.

FIG. 14 is a flowchart illustrating a process that is performed in the network management station 210.

Prior to entering this flowchart, it is assumed that the quality monitor 219 first performs the same processing steps as the steps S10 and S11 described in the above first embodiment. That is, upon receiving quality information from a second network control entity 160, the quality monitor 219 stores response time, throughput, and date/time of measurement per link included in the received quality information into the response time column 112h, throughput column 112g, latest measurement date/time column 112i of the contract link information table 112a and, moreover, stores the time instant of the update done into the update date/time column 112j. The quality monitor 219 also performs a task of updating an average value of response time (average response time) stored in the average response time column 213l of the service contract information table 213a, using the response time included in the received quality information.

Then, the quality monitor 219 checks the update date/time column 112j in the contract link information table 112a periodically (e.g., at intervals of one minute) (S30). If quality information has been updated after the time of the last check (Yes in S30), the quality monitor 219 goes to step S31; if not, it terminates the process (No in S30).

Then, the quality monitor 219 retrieves a list of hub area IDs from the user hub area ID column 112b of the records for which quality information has been updated. Moreover, in the trouble ticket information table 115a, the quality monitor 219 locates records in which the status column 155e contains a letter string "remedied", "impossible to remedy", or "detected" and retrieves a list of hub areas from the user hub area column 115f of the records (S31).

The quality monitor 219 then retrieves information stored in one or more records associated with each hub area 2 in the hub area ID list created in the step S31 from the contract link information table 112a, the service contract information table 213a, and the link usage information table 114a (S32). Processing here is the same as in the step S12 described above in the first embodiment, except that object hub area IDs are plural.

Then, the control decision part 220 puts the hub area IDs identified in the step S31 in descending order of priority with regard to the priority levels of the hub areas 2 and performs processing in steps S34 to S48, as will be described below, for each of the hub areas 2 in descending order of priority.

For example, the control decision part 220 determines the priority levels of the hub areas 2, based on the following criterion: for each hub area 2, the lower the degree of attaining contract equality conditions, the higher will be the priority level of the hub area.

Here, in the present embodiment, as the degree of attaining contract quality conditions per hub area 2, the control decision part 220 calculates an attainment degree α expressed by the following equation (1) per hub area.

$$\alpha = \frac{1}{n}\sum_{i=1}^{n}\left(\frac{RTTtg\_i}{RTTav\_i} \times 100\right) \tag{1}$$

In the above equation, "n" represents the number of contracts provided in the hub area 2, "RTTtg" represents minimum response time for each contract (determined by a value in the minimum response time column 213h of the service contract information table 213a), and "RTTav" represents average response time (determined by a value in the average response time column 213l of the service contract information table 213a).

For example, in the example of the service contract information table 213a shown in FIG. 13, when the hub areas 2 are put in descending order of priority (ascending order of the attainment degree), the IDs of each hub area are put in order of B-1 (attainment degree α=100%), C-1 (attainment degree α=133%), and A-1 (attainment degree α=200%).

Then, the quality monitor 219 determines whether the response time (specified in the response time column 112h of the contract link information table 112a) and throughput (specified in the throughput column 112g of the contract link information table 112a) of each link included in the quality information for the object hub area 2 satisfy the quality conditions defined in the service contract information table 213a (S34). If at least either of the response time and throughput of each link included in the quality information does not satisfy the quality conditions (No in step S34), the quality monitor 219 goes to step S35; if the response time and throughput of each link included in the quality information satisfy the quality conditions (Yes in step S34), the quality monitor 219 goes to step S43. This processing is the same as in the step S13 described above in the first embodiment.

At step S35, the quality monitor 219 creates and registers new trouble ticket information into the trouble ticket information table 115a and notifies the control decision part 220 of the created trouble ticket information and the information contained in the records retrieved in the step S32. This processing is the same as in the step S14 described above in the first embodiment.

Then, the control decision part 220 creates a link usage plan for the links in descending order of the priority levels retrieved from the priority among communications in the hub area column 213j of the service contract information table 213a (S36). In this processing, to the link assignment conditions (1) to (3) described for the step S15 in FIG. 10, an additional condition (4) below is added.

(4) The unoccupied bandwidth of the link between the first network control entity 130 in the service center and the WAN 190 (this link is hereinafter referred to as a center-side access link) (the unoccupied bandwidth is a bandwidth that remains after subtracting a total of bandwidths in use assigned to the service contracts that are now using the WAN 190 from the bandwidth of the center-side access link) is more than the bandwidth in use specified in the bandwidth in use column 113g or the minimum ensured bandwidth in case of emergency specified in the minimum ensured bandwidth in case of emergency column 113i of the record associated with the object contract ID in the contract link information table 112a. Here, the bandwidth of the center-side access link is the link bandwidth of the WAN 190 provided under a contract between the service center operator and the network operator providing link services of WANs 190.

The unoccupied bandwidth of the center-side access link may be calculated in the above-described manner. For example, this bandwidth may be calculated as follows: the amount of data actually communicated per service contract is measured beforehand at the first network control entity 130, the second network control entity 160, or by a special measurement device according to a heretofore known method (e.g., counting communication packets routed by a router) and the total amount of data measured is subtracted from the bandwidth of the center-side access link. Then, the control decision part 220 confirms whether at least one or more link usage plans are available (S37). If the link usage plans are available (Yes in step S37), the control decision part 220 goes to step S38; if no link usage plans are available, the control decision part 220 goes to step S47.

Then, the control decision part 220 selects one link usage plan from the one or more link usage plans (S38). This processing is the same as in the step S17 described above in the first embodiment.

Based on one link usage plan selected, the control decision part 220 then transmits remedy command information to request the transmission of communication data through the links identified in the link usage plan to the second network control entity 160 situated in the hub area 2 for which it created the link usage plan (S39). This processing is the same as in the step S18 described above in the first embodiment.

Then, the control decision part 220 determines whether the remedy has been completed in the second network control entity 160, based on the remedy information transmitted in the step S39 (S40). If the remedy has not been completed (No in step S40), the control decision part 220 goes to step S47; if the remedy has been completed (Yes in step S40), the control decision part 220 goes to step, S41. This processing is the same as in the step S19 described above in the first embodiment.

The control decision part 220 then updates the link in use information table 114a and the trouble ticket information table 115a, based on the adopted link usage plan 120a (S41). This processing is the same as in the step S20 described above in the first embodiment.

At step S42, the control decision part 220 determines whether a remedial procedure has been completed for all hub areas listed in the step S31 (wherein the remedial procedure refers to processing in the steps S33 to S41 and the steps S43 to S48). If the procedure has not been completed (No in step S42), the control decision part 220 returns to the step S33 and repeats the processing. If the procedure has been completed (Yes in step S42), the control decision part 220 terminates the process. On the other hand, if the quality conditions of the links are satisfied, as determined in the step S34 (Yes in step S34), the control decision part 220 determines whether a trouble was remedied for the links in the trouble ticket information table 115a (here, a letter string "remedied", "detected" or "impossible to remedy" may be stored) (S43). If a trouble was remedied for the links (Yes in step 43), the control decision part 120 goes to step S44; if no remedy was taken for the links (No in step 43), the control decision part 120 goes to step S42.

Then, the control decision part 220 determines whether the links identified in the default link ID column 213f of the service contract information table 213a for the hub area 2, retrieved from the service contract information table 213a in the step S32, satisfy the quality conditions, using the bandwidths specified in the bandwidth in use column 213g (S44). If the default links satisfy the quality conditions (Yes in step S44), the control decision part 220 creates a link usage plan using the default links identified in the default link ID column 213f and the bandwidths specified in the bandwidth in use column 213g and transmits the remedy command to the second network control entity 160 in the same manner as in the step S39. Subsequent steps S40 to S42 are the same as described above. However, in the step S41, when updating the trouble ticket information table 115a, the control decision part retrieves one or more records in which the status column 115e contains "remedied", "detected" or "impossible to remedy" among the records in which the ID of the hub area is stored in the hub area ID column 115f and stores a letter string "recovered" in the status column 115e of the records, thus updating the trouble ticket information table 115a.

At the step S44, otherwise, if the default links do not satisfy the quality conditions (No in step S44), the control decision part 220 goes to step S45.

At step S45, the control decision part 220 then creates link usage plans in the same manner as in the step S36 (S45).

Then, the control decision part 220 recalculates an average degree of attaining quality conditions with the links being used now and compares this average degree with each of the average degrees of attaining quality conditions for the link usage plans created in the step S45 (S46). If there is a link usage plan having a higher average degree of attaining quality conditions than the average degree of attaining quality conditions with the links being used now (Yes in step S46), the control decision part 220 executes the remedy based on that link usage plan by the same processing as in the steps S39 to S42. However, it does not update the status column 115e of the trouble ticket information table 115a in the step S41.

Otherwise, if there is no link usage plan having a higher average degree of attaining quality conditions than the average degree of attaining quality conditions with the links being used now (No in step S46), the control decision part 220 goes to step 42.

At step S47, the control decision part 220 notifies the administrator, e.g., by causing the output unit 123 to display a predetermined error notification or the like.

Then, the control decision part 220 updates the trouble ticket information table 115a by storing a letter string "impossible to remedy" in the status column 115e of the new record registered in the step S35 in the trouble ticket information table 115a (S48).

As described above, according to the second embodiment, even if a failure affecting communications over a wide range has occurred, by carrying out link switching, taking account of the priority levels of the hub areas 2 involved, together with the impact on the entire system, it is possible to achieve improving degraded communication quality, while suppressing the impact on other communications which are performed normally.

Next, a third embodiment is described. The following description relates to a network management station according to the third embodiment, because the network management station differs from that in the first embodiment.

In the technique described in the first embodiment, for example, in a situation where WANs 190 include a wireless communication network such as WiMAX in which communication quality varies frequently, link switching occurs frequently each time communication quality degradation and recovery recur and there is a risk that communication quality as a whole further degrades due to time taken for switching and for other reasons.

Accordingly, in the third embodiment, by varying time allowed until determining that quality has recovered from degradation depending on the degree of variability in communication quality, improving degraded communication quality is achieved properly even in the multi-home environment including a network in which communication quality is liable to vary.

Figure 15:
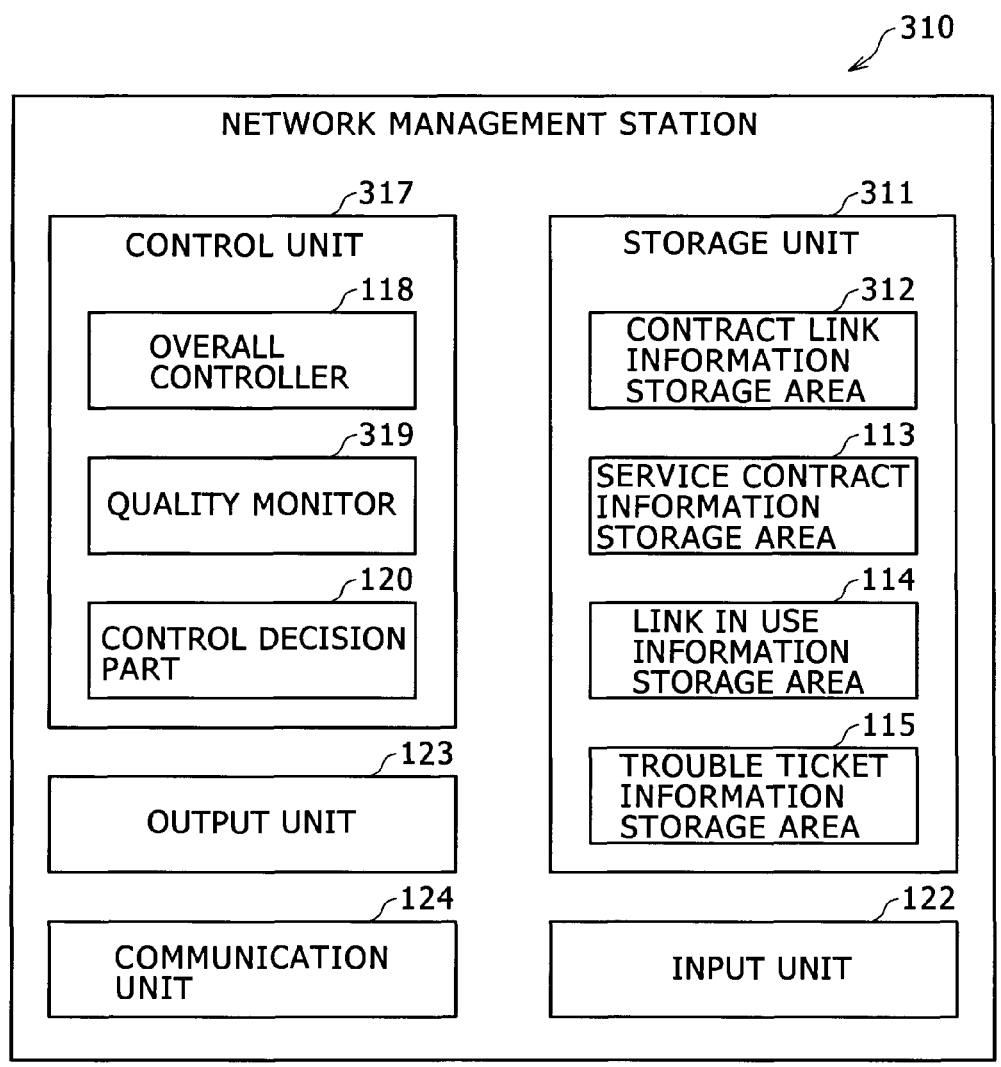
FIG. 15 is a diagram illustrating an overview of a network management station.

FIG. 15 is an overview diagram of a network management station 310 in the third embodiment. As shown here, the network management station 310 includes a storage unit 311, a control unit 317, an input unit 122, an output unit 123, and a communication unit 124. The following description relates to the storage unit 311 and the control unit 317 which differ from those in the first embodiment.

The storage unit 311 includes a contract link information storage area 312, a service contract information storage area 113, a link in use information storage area 114, and a trouble ticket information storage area 115. The following description relates to the contract link information storage area 312 which differs from the corresponding area in the first embodiment.

In the contract link information storage area 312, contract link information specifying WANs 190 that users in each hub area 2 are allowed to use and the attributes of the WANs 190 is stored. In the present embodiment, for example, a contract link information table 312a is stored which is illustrated in FIG. 16 (an overview diagram of a contract link information table 312a).

The contract link information table 312a has a user hub area ID column 312b, link ID column 312c, link type column 312d, bandwidth 312e, address column 312f, throughput column 312f, response time column 312h, and standard deviation of response time column 312i. In contrast with the first embodiment, the standard deviation of response time column 312i is added and, therefore, an explanation is provided about the standard deviation of response time column 312i.

In the standard deviation of response time column 312i, a value of standard deviation of response time for a link identified in the link ID column 312c, derived from quality information received at predetermined intervals from a second network control entity 160 situated in a hub area 2 identified in the user hub area ID column 312b. Here, the standard deviation of response time represents a degree of variability in quality (in terms of response time, here) of the link.

It is preferable that, each time quality information is acquired, the quality monitor 319 calculates and updates a value of standard deviation of response time stored in the standard deviation of response time column 312i.

Returning to FIG. 15, the control unit 317 includes an overall controller 118, a quality monitor 319, and a control decision part 120. Because the quality monitor 319 performs processing in a different manner, as compared with the first embodiment, the following description relates to the quality monitor 319.

The quality monitor 319 in the present embodiment receives quality information form the second network control entity 160 via the communication unit 124 and monitors communications.

In the present embodiment, for example, in the decision step S13 in the flowchart shown in FIG. 10, the quality monitor 319 retrieves the value in the standard deviation of response time column 312i of each of records in which the links identified in the quality information acquired in the step S12 are stored in the link ID column 312c in the contract link information table 312a and determines the quality of a link from an average of counts of quality information acquired in the past in proportion to the level (extent) of the retrieved standard deviation. Here, the quality information used here is assumed to be stored in the storage unit 311.

In one example shown in FIG. 16, for a wired WAN link service A using a link with ID A-1-1 in a user hub area A-1, the value of standard deviation of response time is "5" which indicates a relatively stable quality of communication. Hence, for example, from one count of quality information acquired in the past, it is directly determined whether the link satisfies the quality conditions. For a wireless WAN link service B using a link with ID A-1-2 in the user hub area A-1, the value of standard deviation of response time is "15" which indicates a large variability in communication quality. Hence, from an average of three counts of quality information acquired in the past, it is determined whether the link satisfies the quality conditions.

As described above, according to the third embodiment, time allowed until determining whether a link satisfies the quality conditions is varied depending on the degree of variability in communication quality. Thereby, determination as to whether a link satisfies the quality conditions is made quickly for a stable quality link and reliably for an unstable quality link at the cost of some delay before the determination. In this way, it is possible to achieve improving degraded communication quality even in the multi-home environment including a network in which communication quality is liable to vary.

In the above-described third embodiment, the quality monitor 319 calculates a value of standard deviation of response time and determines quality from an average of counts of quality information acquired in the past in proportion to the level (extent) of the calculated value of standard deviation. However, there is no limitation to this manner. For example, a value of standard deviation of bandwidth may be calculated and quality may be determined from an average of counts of quality information acquired in the past in proportion to the level (extent) of the calculated value of standard deviation.

In the above-described embodiments, the network management stations 110, 210, 310 are coupled to the LAN 150, but there is no imitation to this manner; they may be coupled to the WAN 190.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A network management station configured to determine a combination of links to be used by a network control entity configured to perform communication by using a plurality of links, the network management station comprising:
a storage unit for storing contract link information including links, measure (throughputs of the links, and measured response times of the links; and service contract information specifying links in use for services, bandwidths in use by the links, minimum response times required for the links, minimum ensured bandwidths required for the links, and priority levels of the services; and
a control unit comprising one or more computers,
wherein the control unit, when having determined that at least either of the measured throughput and the measured response time of a link in the contract link information does not satisfy the minimum ensured bandwidth or the minimum response time for the link in the service contract information, is configured to:
assign a link whose measured throughput in the contract link information satisfies either of its minimum ensured bandwidth and its bandwidth in use in the service contract information and whose measured response time in the contract link information satisfies its minimum response time in the service contract information to each of the services in descending order of priority in the service contract information;
create a link usage plan in which the control unit assigns a link whose measured throughput in the contract link information satisfies either of its minimum ensured bandwidth and its bandwidth in use in the service contract information and whose measured response time in the contract link information satisfies its minimum response time in the service contract information to each of the services in descending order of priority in the service contract information;
wherein, when a plurality of created link usage plans are available, the control unit is configured to adopt the link usage plan using a combination of links having a higher average degree of attaining conditions as a link whose throughput in the contract link information satisfies either of its minimum ensured bandwidth and its bandwidth in use in the service contract information and whose response time in the contract link information satisfies its minimum response time in the service contract information;
wherein, when there are link usage plans having an equal average degree of attaining conditions, the control unit is configured to select a link usage plan, which has a smaller number of times of link switching.

2. The network management station according to claim 1, wherein throughputs and response times in the contract link information are measured by the network control entity and output to the network management station.

3. The network management station according to claim 1, wherein the control unit, when having determined that the measured throughput and the measured response time of the link in the contract link information satisfy the minimum ensured bandwidth and the minimum response time for the link in the service contract information, is configured to perform a task of returning a link used for a service for which the link determined to satisfy the minimum ensured bandwidth and the minimum response time for the link in the service contract information is a default link in use in the service contract information to the link determined to satisfy.

4. The network management station according to claim 1, wherein, in a case that there are a plurality of network control entities;
in the storage unit,
contract link information specifying links, throughputs of the links, and response times of the links for each of hub areas where the network control entities are situated, and
service contract information specifying links in use for services, bandwidths in use by the links, minimum response times required for the links, minimum ensured bandwidths required for the links, and priority levels of the services for each of hub areas where the network control entities are situated are stored;
wherein the control unit, when having determined that at least either of the measured throughput and the measured response time of the link in the contract link information does not satisfy the minimum ensured bandwidth or the minimum response time for the link in the service contract information in a plurality of hub areas where the network control entities are situated, is configured to assign a link whose measured throughput in the contract link information satisfies either of its minimum ensured bandwidth and its bandwidth in use in the service contract information and whose measured response time in the contract link information satisfies its response time in the service contract information to each of the services in descending order of priority in the service contract information in each hub area in order of priority of the hub areas.

5. The network management station according to claim 1, wherein, in a case that there are a plurality of network control entities;
the storage unit stores:
contract link information specifying links, throughputs of the links, and response times of the links for each of hub areas where the network control entities are situated, and
service contract information specifying links in use for services, bandwidths in use by the links, minimum response times required for the links, minimum ensured bandwidths required for the links, and priority levels of the services for each of hub areas where the network control entities are situated;
wherein the control unit, when having determined that at least either of the measured throughput and the measured response time of the link in the contract link information does not satisfy the minimum ensured bandwidth or the minimum response time for the link in the service contract information in a plurality of hub areas where the network control entities are situated, is configured to calculate for each of the hub areas a degree of attaining response time in proportion to a value obtained by dividing the minimum response time in the service contract information by an average of response time of the contract link for a certain period in the contract link information and sets the priority higher in ascending order of the degree of attaining response time.

6. The network management station according to claim 1, wherein the contract link information further includes information specifying an average degree of variability in the quality of the links,
wherein the control unit is configured to perform the assigning of a link, if having determined that at least either of the measured throughput and the measured response time of the link in the contract link information does not satisfy the minimum ensured bandwidth or the minimum response time for the link in the service contract information for a successive number of times predetermined in proportion to the average degree of variability.

7. A network control system comprising a network control entity configured to perform communication by using a plurality of links and a network management station configured to determine a combination of links to be used by the network control entity, wherein the network management station includes:

a storage unit for storing contract link information including links, measured throughputs of the links, and measured response times of the links; and service contract information specifying links in use for services, bandwidths in use by the links, minimum response times required for the links, minimum ensured bandwidths required for the links, and priority levels of the services; and a control unit comprising one or more computers, wherein the control unit, when having determined that at least either of the measured throughput and the measured response time of a link in the contract link information does not satisfy the minimum ensured bandwidth or the minimum response time for the link in the service contract information, is configured to:

assign a link whose measured throughput in the contract link information satisfies either of its minimum ensured bandwidth and its bandwidth in use in the service contract information and whose measured response time in the contract link information satisfies its minimum response time in the service contract information to each of the services in descending order of priority in the service contract information;

create a link usage plan in which the control unit assigns a link whose measured throughput in the contract link information satisfies either of its minimum ensured bandwidth and its bandwidth in use in the service contract information and whose measured response time in the contract link information satisfies its minimum response time in the service contract information to each of the services in descending order of priority in the service contract information;

wherein, when a plurality of created link usage plans are available, the control unit is configured to adopt the link usage plan using a combination of links having a higher average degree of attaining conditions as a link whose throughput in the contract link information satisfies either of its minimum ensured bandwidth and its bandwidth in use in the service contract information and whose response time in the contract link information satisfies its minimum response time in the service contract information;

wherein, when there are link usage plans having an equal average degree of attaining conditions, the control unit is configured to select a link usage plan, which has a smaller number of times of link switching.

8. The network control system according to claim 7, wherein throughputs and response times in the contract link information are measured by the network control entity and output to the network management station.

9. The network control system according to claim 7, wherein the control unit of the network management station, when having determined that the measured throughput and the measured response time of the link in the contract link information satisfy the minimum ensured bandwidth and the minimum response time for the link in the service contract information, is configured to perform a task of returning a link used for a service for which the link determined to satisfy the minimum ensured bandwidth and the minimum response time for the link in the service contract information is a default link in use in the service contract information to the link determined to satisfy.

10. The network control system according to claim 7, wherein, in a case that there are a plurality of network control entities;

in the storage unit of the network management station are stored:

contract link information specifying links, throughputs of the links, and response times of the links for each of hub areas where the network control entities are situated, and service contract information specifying links in use for services, bandwidths in use by the links, minimum response times required for the links, minimum ensured bandwidths required for the links, and priority levels of the services for each of hub areas where the network control entities are situated;

wherein the control unit of the network management station, if having determined that at least either of the measured throughput and the measured response time of the link in the contract link information does not satisfy the minimum ensured bandwidth or the minimum response time for the link in the service contract information in a plurality of hub areas where the network control entities are situated, is configured to assign a link whose measured throughput in the contract link information satisfies either of its minimum ensured bandwidth and its bandwidth in use in the service contract information and whose measured response time in the contract link information satisfies its minimum response time in the service contract information to each of the services in descending order of priority in the service contract information in each hub area in order of priority of the hub areas.

11. The network control system according to claim 7, wherein, in a case that there are a plurality of network control entities;

in the storage unit of the network management station are stored:

contract link information specifying links, throughputs of the links, and response times of the links for each of hub areas where the network control entities are situated, and service contract information specifying links in use for services, bandwidths in use by the links, minimum response times required for the links, minimum ensured bandwidths required for the links, and priority levels of the services for each of hub areas where the network control entities are situated;

wherein the control unit of the network management station, if having determined that at least either of the measured throughput and the measured response time of the link in the contract link information does not satisfy the minimum ensured bandwidth or the minimum response time for the link in the service contract information in a plurality of hub areas where the network control entities are situated, is configured to calculate for each of the hub areas a degree of attaining response time in proportion to a value obtained by dividing the minimum response time in the service contract information by an average of response time of the contract link for a certain period in the contract link information and sets the priority higher in ascending order of the degree of attaining response time.

12. The network control system according to claim 7,
wherein the contract link information further includes information specifying an average degree of variability in the quality of the links,
wherein the control unit of the network management station is configured to perform the assigning of a link, if having determined that at least either of the measured throughput and the measured response time of the link in the contract link information does not satisfy the minimum ensured bandwidth or the minimum response time for the link in the service contract information for a successive number of times predetermined in proportion to the average degree of variability.

13. A network management method for determining by a network management station a combination of links to be used by a network control entity configured to perform communication by using a plurality of links, wherein the network management station comprises a storage unit for storing contract link information including links, measured throughputs of the links, and measured response times of the links; and service contract information specifying links in use for services, bandwidths in use by the links, minimum response times required for the links, minimum ensured bandwidths required for the links, and priority levels of the services; and a control unit comprising one or more computers,
the network management method including:
when having determined that at least either of the throughput and the response time of a link in the contract link information does not satisfy the minimum ensured bandwidth or the minimum response time for the link in the service contract information,
assigning, using the control unit, a link whose measured throughput in the contract link information satisfies either of its minimum ensured bandwidth and its bandwidth in use in the service contract information and whose measured response time in the contract link information satisfies its minimum response time in the service contract information to each of the services in descending order of priority in the service contract information;
creating, using the control unit, a link usage plan in which the control unit assigns a link whose measured throughput in the contract link information satisfies either of its minimum ensured bandwidth and its bandwidth in use in the service contract information and whose measured response time in the contract link information satisfies its minimum response time in the service contract information to each of the services in descending order of priority in the service contract information,
when a plurality of created link usage plans are available,
adopting, using the control unit, the link usage plan using a combination of links having a higher average degree of attaining conditions as a link whose measured throughput in the contract link information satisfies either of its minimum ensured bandwidth and its bandwidth in use in the service contract information and whose response time in the contract link information satisfies its minimum response time in the service contract information;
when there are link usage plans having an equal average degree of attaining conditions, selecting, using the control unit, a link usage plan, which has a smaller number of times of link switching.

14. The network management method according to claim 13,
wherein throughputs and response times in the contract link information are measured by the network control entity and output to the network management station.

15. The network management method according to claim 13, further comprising:
when having determined that the measured throughput and the measured response time of the link in the contract link information satisfy the minimum ensured bandwidth and the minimum response time for the link in the service contract information,
performing, using the control unit, a task of returning a link used for a service for which the link determined to satisfy the minimum ensured bandwidth and the minimum response time for the link in the service contract information is a default link in use in the service contract information to the link determined to satisfy.

16. The network management method according to claim 13,
wherein, in a case that there are a plurality of network control entities;
in the storage unit are stored:
contract link information specifying links, throughputs of the links, and response times of the links for each of hub areas where the network control entities are situated, and
service contract information specifying links in use for services, bandwidths in use by the links, minimum response times required for the links, minimum ensured bandwidths required for the links, and priority levels of the services for each of hub areas where the network control entities are situated;
further comprising:
when having determined that at least either of the measured throughput and the measured response time of the link in the contract link information does not satisfy the minimum ensured bandwidth or the minimum response time for the link in the service contract information in a plurality of hub areas where the network control entities are situated,
assigning, using the control unit, a link whose measured throughput in the contract link information satisfies either of its minimum ensured bandwidth and its bandwidth in use in the service contract information and whose measured response time in the contract link information satisfies its response time in the service contract information to each of the services in descending order of priority in the service contract information in each hub area in order of priority of the hub areas.

17. The network management method according to claim 13,
wherein, in a case that there are a plurality of network control entities;
in the storage unit are stored:
contract link information specifying links, throughputs of the links, and response times of the links for each of hub areas where the network control entities are situated, and
service contract information specifying links in use for services, bandwidths in use by the links, minimum response times required for the links, minimum ensured bandwidths required for the links, and priority levels of the services for each of hub areas where the network control entities are situated;
further comprising:
when having determined that at least either of the measured throughput and the measured response time of the link in the contract link information does not satisfy the minimum ensured bandwidth or the minimum response time for the link in the service contract information in a plurality of hub areas where the network control entities are situated, calculating, using the control unit, for each of the hub areas a degree of attaining response time in proportion to a value obtained by dividing the minimum response time in the service contract information by an average of response time of the contract link for a certain period in the contract link information and sets the priority higher in ascending order of the degree of attaining response time.

18. The network management method according to claim 13, wherein the contract link information further includes information specifying an average degree of variability in the quality of the links, further comprising:

performing, using the control unit, the assigning of a link, if having determined that at least either of the throughput and the response time of the link in the contract link information does not satisfy the minimum ensured bandwidth or the minimum response time for the link in the service contract information for a successive number of times predetermined in proportion to the average degree of variability.

* * * * *